(12) United States Patent  
Guo

(10) Patent No.: US 9,185,040 B2  
(45) Date of Patent: Nov. 10, 2015

(54) FLOW LABEL NEGOTIATION METHOD, RELATED DEVICE, AND SYSTEM

(71) Applicant: Huawei Technologies Co., Ltd., Shenzhen, Guangdong (CN)

(72) Inventor: Xinchun Guo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 85 days.

(21) Appl. No.: 13/961,457

(22) Filed: Aug. 7, 2013

(65) Prior Publication Data

US 2013/0322248 A1  Dec. 5, 2013

Related U.S. Application Data

(63) Continuation of application No. PCT/CN2012/070763, filed on Jan. 30, 2012.

(30) Foreign Application Priority Data

Feb. 9, 2011  (CN) .......................... 2011 1 0035177

(51) Int. Cl.  
*H04L 1/00* (2006.01)  
*H04L 12/803* (2013.01)  
(Continued)

(52) U.S. Cl.  
CPC ............ *H04L 47/125* (2013.01); *H04L 45/507* (2013.01); *H04L 47/724* (2013.01); *H04L 45/24* (2013.01); *H04L 45/38* (2013.01)

(58) Field of Classification Search  
CPC ......... H04L 47/10; H04L 47/11; H04L 47/12; H04L 47/13; H04L 5/0053; H04J 3/16; H04J 3/17; H04J 3/18; H04J 3/19  
USPC ...................... 370/229–230.1, 236, 400, 401, 370/464–465, 389, 392  
See application file for complete search history.

(56) References Cited

U.S. PATENT DOCUMENTS

2012/0093165 A1* 4/2012 Guo .............................. 370/400

FOREIGN PATENT DOCUMENTS

CN          1691636 A     11/2005  
CN          1859277 A     11/2006  
(Continued)

OTHER PUBLICATIONS

Kompella et al., "The Use of Entropy Labels in MPLS Forwarding," Internet-Draft, Network Working Group, draft-kompella-mpls-entropy-label-01.txt, IETF Trust (Jul. 12, 2010).

(Continued)

*Primary Examiner* — Dady Chery  
(74) *Attorney, Agent, or Firm* — Huawei Technologies Co., Ltd.

(57) ABSTRACT

A flow label negotiation method is disclosed. The method in the embodiments of the present invention includes: constructing an RSVP-TE path message, where the path message includes a first FL capability flag bit; marking a local FL transmit and receive capability in the first FL capability flag bit; sending the path message to an egress node through a load distribution node; receiving an RSVP-TE resv message which is sent by the egress node through the load distribution node, where the resv message includes a second FL capability flag bit; and obtaining, from the second FL capability flag bit, an FL transmit and receive capability of the egress node, and completing FL negotiation. In addition, the embodiments of the present invention further provide a related device and a system for implementation of the method.

27 Claims, 11 Drawing Sheets

(51) Int. Cl.
*H04L 12/723* (2013.01)
*H04L 12/913* (2013.01)
H04L 12/721 (2013.01)
H04L 12/707 (2013.01)

(56) References Cited

FOREIGN PATENT DOCUMENTS

| | | |
|---|---|---|
| CN | 101674228 A | 3/2010 |
| CN | 101877892 A | 11/2010 |
| CN | 101945015 A | 1/2011 |
| EP | 1722524 A1 | 11/2006 |
| EP | 1786158 A1 | 5/2007 |
| EP | 2426887 A1 | 3/2012 |
| WO | WO 2010124537 A1 | 11/2010 |

OTHER PUBLICATIONS

Thomas et al., "LDP Capabilities," Jul. 2009, Network Working Group, IETF, Fremont, California.

Carpenter et al., "Using the IPv6 Flow Label for Equal Cost Multipath Routing and Link Aggregation in Tunnels," Oct. 7, 2010, Network Working Group, IETF, Fremont, California.

Sun et al., "IPv6 End-to-End QoS Provision in Heterogeneous Networks Using Flow Label," 2008, IEEE, New York, New York.

International Search Report in corresponding PCT Patent Application No. PCT/CN2012/070763 (May 3, 2012).

\* cited by examiner

FLOW LABEL NEGOTIATION METHOD, RELATED DEVICE, AND SYSTEM

CROSS-REFERENCE TO RELATED APPLICATIONS

This application is a continuation of International Patent Application No. PCT/CN2012/070763, filed on Jan. 30, 2012, which claims priority to Chinese Patent Application No. 201110035177.1, filed on Feb. 9, 2011, both of which are hereby incorporated by reference in their entireties.

FIELD OF THE INVENTION

The present invention relates to communications technologies, and in particular, to a flow label negotiation method, a related device, and a system.

BACKGROUND OF THE INVENTION

The resource reservation protocol (RSVP, Resource Reservation Protocol) is a control protocol on a network, which is used for performing resource reservation on each node of a path. The RSVP works in a transmission layer, but does not participate in application data transfer. The RSVP supports distribution of a multi-protocol label switching (MPLS, Multi-Protocol Label Switching) label after being extended, and carries resource reservation information at the same time when transferring a label binding message, where the extended RSVP is referred to as a resource reservation protocol-traffic engineering (RSVP-TE, Resource Reservation Protocol-traffic Engineering).

A label switched path (LSP, Label Switched Path) established by adopting the RSVP-TE has a resource reservation function, a label switching router (LSR, Label Switching Router) along the path may distribute certain resources to the LSP, so as to guarantee a service transferred on the LSP. When establishing the LSP, the RSVP-TE mainly depends on two message types, a path (Path) message and a resv (Resv) message. RSVP-TE extension is mainly to add a new object in the Path message and Resv message of the RSVP-TE, and in addition to that the newly added object may carry the label binding information, the newly added object may also carry restriction information in routing the LSR along the path, such as a bandwidth, so as to support a function that the LSP constrains a routing.

The LSP established by adopting the RSVP-TE has the resource reservation function, the LSR (herein after referred to as node for short) along the path may distribute certain resources to the LSP, so as to guarantee the service transferred on the LSP. For RSVP message processing, a standard RSVP processing process is followed: an ingress (Ingress) node of the LSR generates a Path message for a session, and forwards along nodes on the LSP until forwarding to an egress (Egress) node; and after receiving the Path message, the egress node generates a Resv message and returns the Resv message to the ingress node, and in the returning process, the Resv message performs the label distribution and resource reservation on the nodes along the LSP.

At present, under the background of packet data traffic being increasingly large, some multi-path technologies emerge, such as an equal-cost multi-path routing (ECMP, Equal-Cost Multi-Path Routing) technology and a link aggregation group (LAG, Link Aggregation Group) technology.

At present, an MPLS network supports the multi-path technologies such as the ECMP and the LAG, which is widely deployed. The deployment of a multi-path such as the ECMP and the LAG, may, on one hand, provide high bandwidth and path protection, and on the other hand, existence of the multi-path also introduces a certain negative effect: a disorder is caused to packets forwarded through different paths. As the service (especially some real-time services) has a higher and higher demand for quality of service, how to make full use of advantages of the multi-path technologies such as the ECMP and the LAG and avoid a problem brought about by the multi-path technologies are problems that the Internet engineering task force (IETF, Internet Engineering Task Force) concerns about and hopes to solve at present.

In the prior art, to solve the foregoing problem, flow label application is introduced: on the ingress node of the LSP, different service flows are distributed and encapsulated with a flow label, where the service flows may be divided through related information of a data packet header. A flow label is located in a bottom layer of a label stack, the label is invisible in path forwarding, and on a load distribution node (a node before branching) of the multi-path such as the ECMP or the LAG, information of the flow label is used as a parameter of a path calculation (generally a hash algorithm is used), so as to find a suitable equal-cost path link for different service flows to perform load sharing. The introduction of the flow label may accurately forward packets belonging to the same flow by selecting the same path, so as to avoid the disorder of the packets belonging to the same flow.

Because the label-based load sharing carries the flow label in the data packet, a conventional MPLS label stack is changed, and an egress router of the network has to be able to identify and process the flow label, which demands that a special flow is divided and a load sharing mechanism is negotiated between the ingress node and the egress node of an MPLS-based LSP service. In the case of no negotiation mechanism, unnecessary protocol overhead and incorrect processing may be caused because the node does not identify the flow label, so a label-based load sharing mechanism cannot be used without negotiation.

SUMMARY OF THE INVENTION

Embodiments of the present invention provides a flow label negotiation method, a related device, and a system, which are used for solving the problem that a flow label mechanism cannot be used normally when a multi-path LSP forwarding technology is used, causing unnecessary protocol overhead and incorrect processing.

The present invention provides a flow label negotiation method, which includes: constructing a resource reservation protocol-traffic engineering RSVP-TE path message, where the path message includes a first flow label FL capability flag bit; marking a local FL transmit and receive capability in the first FL capability flag bit; sending the path message to an egress node through a load distribution node; receiving an RSVP-TE resv message which is sent by the egress node through the load distribution node, where the resv message includes a second FL capability flag bit; and obtaining, from the second FL capability flag bit, an FL transmit and receive capability of the egress node, and completing FL negotiation.

The present invention provides a flow label negotiation method, which includes: receiving a resource reservation protocol-traffic engineering RSVP-TE path message sent by an ingress node, where the path message includes a first flow label FL capability flag bit; obtaining, from the first FL capability flag bit, an FL transmit and receive capability of the ingress node; forwarding the path message to an egress node; receiving an RSVP-TE resv message sent by the egress node, where the resv message includes a second FL capability flag bit; obtaining, from the second FL capability flag bit, an FL transmit and receive capability of the egress node; judging, according to the FL transmit and receive capability of the ingress node and of the egress node, whether local path calculation is set as label-based path calculation; and forwarding the resv message to the ingress node.

The present invention provides a flow label negotiation method, which includes: receiving a resource reservation protocol-traffic engineering RSVP-TE path message which is sent by an ingress node through a load distribution node, where the path message includes a first FL capability flag bit; obtaining, from the first FL capability flag bit, an FL transmit and receive capability of the ingress node; constructing an RSVP-TE resv message according to the path message, where the resv message includes a second FL capability flag bit; marking a local FL transmit and receive capability in the second FL capability flag bit; and sending the resv message to the ingress node through the load distribution node. It may be seen from the foregoing technical solutions that the embodiments of the present invention have the following advantages: in the present invention, in LSP establishment, a flag bit where the flow label transmit and receive capability of the ingress node is recorded is extended in the path message, so that in the process that the path message is sent to the egress node through the load distribution node, the FL transmit and receive capability of the ingress node is notified to the load distribution node and the egress node, so as to activate an FL negotiation process of the load distribution node and the egress node, enabling the FL to be used normally in the process of multi-path LSP forwarding.

The present invention provides a node, which includes: a path message constructing unit, configured to construct a resource reservation protocol-traffic engineering RSVP-TE path message, where the path message includes a first FL capability flag bit; an ingress capability marking unit, configured to mark a local FL transmit and receive capability in the first FL capability flag bit; a path message sending unit, configured to send the path message to an egress node through a load distribution node; a resv message receiving unit, configured to receive the resv message which is sent by the egress node through the load distribution node, where the resv message includes a second FL capability flag bit; and an egress capability obtaining unit, configured to obtain, from the resv message, an FL transmit and receive capability of the egress node, and complete FL negotiation.

The present invention provides a node, which includes: a first receiving unit, configured to receive a resource reservation protocol-traffic engineering RSVP-TE path message sent by an ingress node, where the path message includes a first FL capability flag bit; a first obtaining unit, configured to obtain, from the first FL capability flag bit, an FL transmit and receive capability of the ingress node; a first forwarding unit, configured to forward the path message to an egress node; a second receiving unit, configured to receive an RSVP-TE resv message sent by the egress node, where the resv message includes a second FL capability flag bit; a second obtaining unit, configured to obtain, from the second FL capability flag bit, an FL transmit and receive capability of the egress node; a setting unit, configured to: according to the FL transmit and receive capability of the ingress node and the FL transmit and receive capability of the egress node, judge whether local path calculation is set as label-based path calculation; and a second forwarding unit, configured to forward the resv message to the ingress node.

The present invention provides a node, which includes: a path message receiving unit, configured to receive a resource reservation protocol-traffic engineering RSVP-TE path message which is sent by an ingress node through a load distribution node, where the path message includes a first FL capability flag bit; an ingress capability obtaining unit, configured to obtain an FL transmit and receive capability of the ingress node from the first FL capability flag bit; a resv message constructing unit, configured to construct an RSVP-TE resv message according to the path message, where the resv message includes a second FL capability flag bit; an egress capability marking unit, configured to mark a local FL transmit and receive capability in the second FL capability flag bit; and a resv message sending unit, configured to send the resv message to the ingress node through the load distribution node.

The present invention provides a flow label negotiation system, which includes: an ingress node, a load distribution node, and an egress node; where the ingress node is configured to construct a resource reservation protocol-traffic engineering RSVP-TE path message, where the path message includes a first FL capability flag bit; mark an FL transmit and receive capability of the ingress node in the first FL capability flag bit; send the path message to the egress node through the load distribution node; receive an RSVP-TE resv message which is sent by the egress node through the load distribution node, where the resv message includes a second FL capability flag bit; and obtain, from the second FL capability flag bit, an FL transmit and receive capability of the egress node, and complete FL negotiation;

the load distribution node is configured to receive the RSVP-TE path message sent by the ingress node; obtain, from the first FL capability flag bit, the FL transmit and receive capability of the ingress node; forward the path message to the egress node; receive the RSVP-TE resv message forwarded by the egress node; obtain, from the second FL capability flag bit, the FL transmit and receive capability of the egress node; judge, according to the FL transmit and receive capability of the ingress node and the FL transmit and receive capability of the egress node, whether local path calculation is set as label-based path calculation; and forward the resv message to the ingress node; and the egress node is configured to receive the RSVP-TE path message which is sent by the ingress node through the load distribution node; obtain, from the first FL capability flag bit, the FL transmit and receive capability of the ingress node; construct the RSVP-TE resv message according to the path message, and mark the FL transmit and receive capability of the egress node in the second FL capability flag bit; and send the resv message to the ingress node through the load distribution node.

DETAILED DESCRIPTION OF THE EMBODIMENTS

Embodiments of the present invention provides a flow label negotiation method, a related device, and a system, which are used for solving the problem that a flow label mechanism cannot be used when a multi-path LSP forwarding technology is used, causing unnecessary protocol overhead and incorrect processing.

Figure 1:
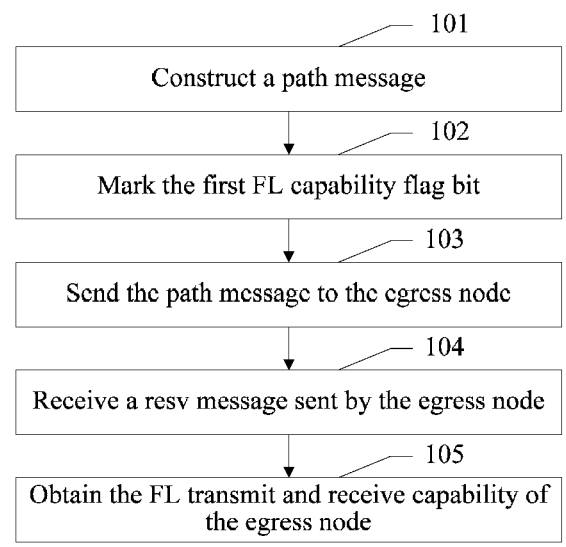
FIG. 1 is a simplified schematic flow chart of a flow label negotiation method according to an embodiment of the present invention.

FIG. 1 is a simplified schematic flow chart of a flow label negotiation method according to an embodiment of the present invention. Referring to FIG. 1, a flow label negotiation method in an embodiment of the present invention includes the following steps:

101: Construct a path message.

For example, an ingress node constructs the path message according to an RSVP-TE standard, where the path message includes a first flow label (FL, Flow Label) capability flag bit.

For example, a first FL capability flag bit is a field extended in an original path message, is used for marking an FL transmit and receive capability of a node, and may be specifically divided into an FL receive capability label and an FL transmit capability label.

For example, a forwarding path from the ingress node to an egress node may be set in the path message, where the forwarding path marks which intermediate node needs to be passed through; and only the egress node and a jump rule may also be set in the path message, and a current node where the path message is located calculates a forwarding path of a next hop of the path message according to the egress node and the jump rule. Because this embodiment of the present invention focuses on an LSP of the multi-path load sharing technology, the intermediate nodes include a load distribution node, and the load distribution node refers to a first node before branching; and multi-path load distribution needs to be performed on the load distribution node.

For example, if multi-protocol label switching service transmission is performed between two end systems, and resource reservation needs to be performed on each node (routing devices) of an intermediate network, so as to satisfy a demand of the service transmission for quality of service (QoS, Quality of Service), the ingress node, as a first node in the intermediate network, establishes an LSP according to the RSVP-TE standard, and the process is mainly as follows:

A path message is constructed and forwarded along the nodes on the LSP until being forwarded to the egress node; and after the egress node receives the path message, a resv message is generated and returned to the ingress node, and in the returning process, the resv message performs the label distribution and resource reservation on each node along the LSP.

If the multi-path load sharing technology is used in the service transmission on the LSP, an FL needs to be applied to perform path distribution for a packet transmitted on the LSP; and therefore, when the LSP is established, FL capability negotiation also needs to be performed on each node on the LSP at the same time.

102: Mark the first FL capability flag bit.

The ingress node marks the first FL capability flag bit according to a local FL transmit and receive capability, so that the load distribution node and the egress node which the path message passes through can obtain an FL transmit and receive capability of the ingress node.

103: Send the path message to the egress node.

The ingress node sends the path message to the egress node through the load distribution node, so as to complete the FL negotiation.

On the LSP of the multi-path load sharing, the path message sent by the ingress node is to pass through the load distribution node definitely, and the negotiation process of the load distribution node is mainly as follows: the load distribution node obtains the FL transmit and receive capability of the ingress node and the egress node; when the ingress node supports FL sending, and the egress node supports FL receiving, the load distribution node sets a path calculation along a direction from the ingress node to the egress node as label-based path calculation, namely, activates a multi-path distribution function of using the FL as an input parameter; or when the egress node supports the FL sending, and the ingress node supports the FL receiving, the load distribution sets a path calculation along a direction from the egress node to the ingress node as the label-based path calculation; and when the load distribution node performs the multi-path distribution according to the FL, the FL negotiation of the load distribution node ends.

When the path message is forwarded to the egress node, the negotiation progress of the egress node is mainly as follows: first, the FL transmit and receive capability of the ingress node is obtained, and it is determined that the ingress node can identify the FL; and then, a resv message is constructed locally, the local FL transmit and receive capability is marked on a second FL capability flag bit of the resv message and the resv message is returned to the ingress node.

Therefore, the main effect of the path message in the negotiation process is: the load distribution node and the egress node are notified of the FL transmit and receive capability of the ingress node, so as to activate a process of the FL negotiation and use between the load distribution node and the egress node.

104: Receive a resv message sent by the egress node.

The ingress node receives the resv message which is sent by the egress node to the ingress node through the load distribution node, and determines that the label-based path calculation function of the load distribution node is activated; where the resv message includes the FL transmit and receive capability of the egress node.

105: Obtain the FL transmit and receive capability of the egress node.

The ingress node obtains, from the second FL capability flag bit of the resv message, the FL transmit and receive capability of the egress node, determines that the egress node may identify the FL, and completes the LSP establishment and the FL negotiation at the same time.

After the FL negotiation is completed, the ingress node may encapsulate different FLs for different flows when the flow enters the LSP path, so that FL-based multi-path selection and packet forwarding may be performed on the load distribution node of the LSP.

In this embodiment of the present invention, in the LSP establishment, a flag bit where the flow label transmit and receive capability of the ingress node is recorded is extended in the path message, so that in the process that the path message is sent to the egress node through the load distribution node, the FL transmit and receive capability of the ingress node is notified to the load distribution node and the egress node, so as to activate the FL negotiation process of the load distribution node and the egress node, enabling the FL to be used normally in the process of the multi-path LSP forwarding.

Figure 2:
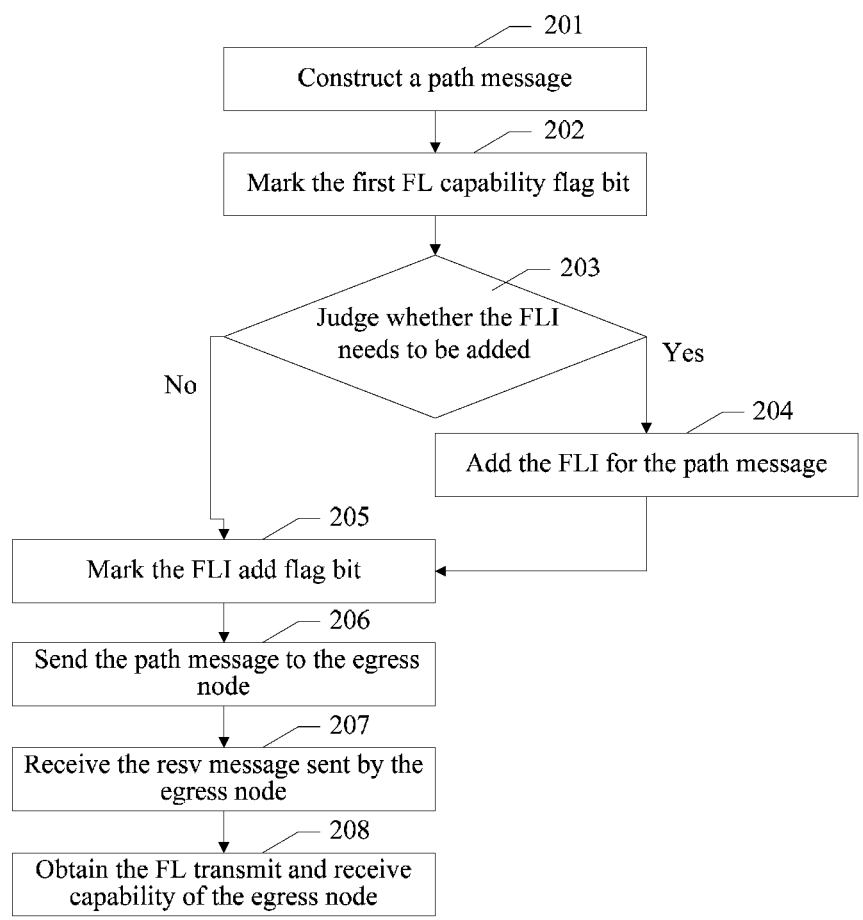
FIG. 2 is a simplified schematic flow chart of a flow label negotiation method according to another embodiment of the present invention.

In the process of performing data packet forwarding, when a receiving end system of a data packet cannot identify an FL in the data packet, incorrect processing may be caused to the data packet. A mechanism of adding a flow label indicator (FLI, Flow label indicator) for a path message is provided by an embodiment of the present invention, and referring to FIG. 2, a flow label negotiation method in this embodiment of the present invention includes:

201: Construct a path message.

For example, an ingress node constructs the path message according to an RSVP-TE standard, where the path message includes a first FL capability flag bit and an FLI add flag bit.

For example, the first FL capability flag bit is used for marking an FL transmit and receive capability of a node, and specifically may be divided into an FL receive capability label and an FL transmit capability label.

For example, during path message construction, in the existing RSVP-TE standard, some object (object) fields are established in the path message (or a resv message), which is used for storing specific load content of the path message, and some fields are reserved in the object fields so as to be used in extending the message subsequently. In this embodiment of the present invention, a type length value (TLV, Type Length Value) field may be extended in the foregoing object fields, or a new object field may be defined, so as to store the first FL capability flag bit and other new FL information; however, if the path message is only used for FL negotiation (namely, the path message only stores indicator information of each flag bit), the first FL capability flag bit may be directly stored in a resv field of an original standard path message, and the TLV field does not have to be extended.

For example, a forwarding path from the ingress node to an egress node may be set in the path message, where the forwarding path marks which intermediate node needs to be passed through; and also only the egress node and a jump rule may be set in the path message, and a current node where the path message is located calculates a forwarding path of a next hop of the path message according to the egress node and the jump rule. Because this embodiment of the present invention focuses on an LSP of the multi-path load sharing technology, the intermediate nodes include a load distribution node, and the load distribution node refers to a first node before branching; and multi-path load distribution needs to be performed on the load distribution node.

For example, the FLI add flag bit means whether the FLI is added in path message, for example: when the FLI is added in the path message the flag bit is set to "1", and when no FLI is added in the path message the flag bit is set to "0". The flag bit may also be stored in the extended TLV field of the path message.

202: Mark the first FL capability flag bit.

Content of step 202 in this embodiment is the same as the content of step 102 in the foregoing embodiment shown in FIG. 1, and is not described here again.

203: Judge whether the FLI needs to be added.

The ingress node judges whether the FLI needs to be added for the path message, if yes, triggers step 204, and triggers step 205 to mark the FLI add flag bit as yes; and if not, triggers step 205 to mark the FLI add flag bit as no.

For example, the following judgment manner may be adopted: the ingress node detects whether an application label exists in a network of the data packet forwarding, for example, a PW label, if the application label exists, the FLI does not need to be added for the path message; and if the application does not exists, the FLI needs to be added for the path message.

For example, in the network of the data packet forwarding, if the application label exists, the application label instructs a receiving terminal system to perform a correct service operation, so the existence of the FL does not cause an incorrect operation of the receiving terminal system; if the application label does not exist, the receiving terminal system may perform forwarding according to the FL, causing an service operation error, so when the application label does not exist, the FLI needs to be added for the path message, enabling the nodes of the LSP to determine the type of the FL, so that in the data packet forwarding after the FL negotiation, an end node of the LSP can identify the FL in the packet, so as to perform processing correctly.

In the network of the data packet forwarding, the effect of the FL lies in that in the LSP of the multi-path load sharing, multi-path resources division is standardized, data packets belonging to the same flow are accurately forwarded by selecting the same path, which avoids the forwarding disorder of the data packets, and therefore, the FL is used on the nodes of the LSP path only; when the data packet passes through the end node (referring to the ingress node or the egress node) and is forwarded to a network outside the LSP, the end node needs to remove the FL, avoiding that the FL is forwarded to the receiving terminal system, which causes the receiving terminal system to perform the incorrect processing and thus generates an error.

204: Add the FLI for the path message.

The ingress node adds the FLI for the path message, so that the node in the LSP can determine the type of the FL, in the data packet forwarding after the FL negotiation, the end node of the LSP can identify the FL in the packet, and correct processing is performed on the data packet carrying the FL.

205: Mark the FLI add flag bit.

The ingress node, according to the foregoing judgment result of step 203, marks the FLI add flag bit as no if the FLI does not need to be added for the path message; and marks the FLI add flag bit as yes if the FLI needs to be added for the path message.

206: Send the path message to the egress node.

The ingress node sends the path message to the egress node through the load distribution node, and performs the FL negotiation, enabling the load distribution node and the egress node to obtain the FL transmit and receive capability of the ingress node in the path message, and obtain the FLI in the path message.

207: Receive the resv message sent by the egress node.

For example, the ingress node receives the resv message which is sent by the egress node to the ingress node through the load distribution node, and determines that the label-based path calculation function of the load distribution node is activated. The resv message includes a second FL capability flag bit, where the second FL capability flag bit marks FL transmit and receive capability information of the egress node.

208: Obtain the FL transmit and receive capability of the egress node.

The ingress node obtains, from the second FL capability flag bit of the resv message, the FL transmit and receive capability of the egress node, determines that the egress node may identify the FL, and completes the LSP establishment and the FL negotiation at the same time.

The negotiation content may include: judging, according to the first FL capability flag bit and the second FL capability flag bit, whether the path from the ingress node to the egress node supports the FL forwarding; where if either the ingress node or the egress node does not have the FL transmit and receive capability, the path from the ingress node to the egress node does not support the FL forwarding; and if both the ingress node and the egress node support the FL transmit and receive capability, the path from the ingress node to the egress node supports the FL forwarding.

After the FL negotiation is completed, the ingress node may perform the data packet forwarding of the multi-path load sharing on the LSP by using the flow label.

In this embodiment of the present invention, the mechanism of adding the FLI for the path is provided, so that when the application label does not exist in the network of the service transmission, the end node in the LSP can determine the type of the FL, so that in the data packet forwarding after the FL negotiation, before the end node of the service packet LSP forwards to the network outside the LSP, the FL in the packet can be removed, thereby avoiding that the FL is forwarded to the receiving terminal system.

Figure 3:
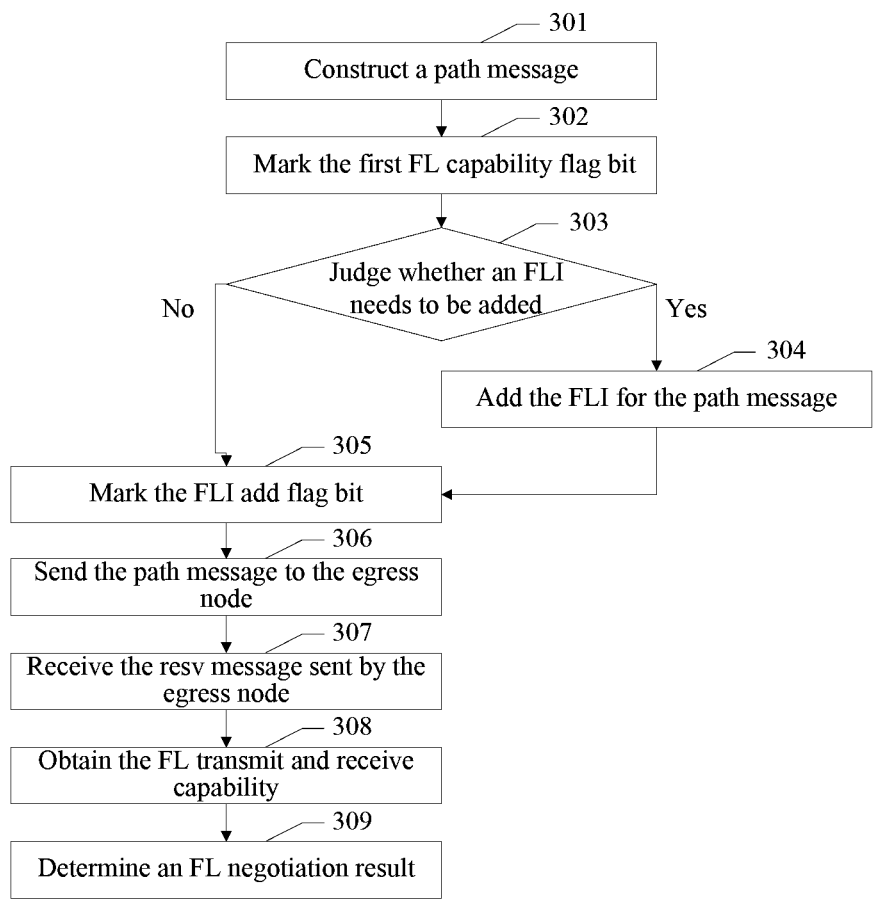
FIG. 3 is a simplified schematic flow chart of a flow label negotiation method according to another embodiment of the present invention.

In commonly used network devices at present, the case that some network devices does not have an application function related to the FL due to insufficient hardware conditions exists, and even though the ingress node performs enabling of the FL identification on the network devices of the nodes through the path message, a related forwarding packet carrying the FL cannot be processed. Therefore, an embodiment of the present invention further provides a mechanism for collecting FL function information of the load distribution node, so as to judge whether a corresponding LSP supports the use of an FL, and referring to FIG. 3, a flow label negotiation method in this embodiment of the present invention includes:

301: Construct a path message.

For example, an ingress node constructs the path message according to an RSVP-TE standard, where the path message includes a first FL capability flag bit and an FLI add flag bit.

In this embodiment of the present invention, a new object (object): a flow label object (FL object) is defined in the path message; the FL object may have a TLV format, and carries FL capability information of the ingress node; when a node on the LSP receives the path message carrying the FL object, if the FL object in the path message cannot be identified, corresponding processing may not be performed on the local according to the content of the FL object, and at the same time it may be judged that the node does not support the application function related to the FL.

302: Mark the first FL capability flag bit.

The ingress node marks a local FL transmit and receive capability by using the first FL capability flag bit in the path message, so that the load distribution node and the egress node through which the path message passes can obtain an FL transmit and receive capability of the ingress node.

303: Judge whether an FLI needs to be added.

The ingress node judges whether the FLI needs to be added for the path message, if yes, triggers step 304, and triggers step 305 to mark the FLI add flag bit as yes; and if not, triggers step 305 to mark the FLI add flag bit as no.

For example, the following judgment manner may be adopted: the ingress node detects whether an application label exists in a network of the data packet forwarding, for example, a PW label, if yes, the FLI does not need to be added for the path message; and if not, the FLI needs to be added for the path message.

304: Add the FLI for the path message.

The ingress node adds the FLI for the path message, so that the node in the LSP can determine the type of the FL, in the data packet forwarding after the FL negotiation, the end node of the LSP can identify the FL in the packet, and correct processing is performed on the data packet carrying the FL.

305: Mark the FLI add flag bit.

The ingress node, according to the foregoing judgment result of step 303, marks the FLI add flag bit as no if the FLI does not need to be added for the path message; and marks the FLI add flag bit as yes if the FLI needs to added for the path message.

306: Send the path message to the egress node.

The ingress node sends the path message to the egress node through the load distribution node, so as to complete the FL negotiation.

After receiving the path message, the load distribution node adds a load FL capability flag bit in the path message, where the load FL capability flag bit is used for marking a label-based path calculation capability of the load distribution node, and multiple load FL capability flag bits may exist, which mark the label-based path calculation capability of different load distribution nodes respectively. For example, the extended TLV field may record a local node identity (ID, Identity) or an interface ID, so as to distinguish different load distribution nodes.

Next, it is judged whether the label-based path calculation capability exists locally, if yes, the load FL capability flag bit is marked according to the local FL capability, and then the FL transmit and receive capability of the ingress node is obtained from the first FL capability flag bit of the path message, and the path message continues to be forwarded to the egress node; if not, the load FL capability flag bit is marked according to the local FL capability, and transparent forwarding is directly performed on the marked path message.

After receiving the path message, the egress node obtains, from the first FL capability flag bit of the path message, the FL transmit and receive capability of the ingress node, and determines that the ingress node can identify the FL. Next, a resv message is constructed according to the path message, a local FL transmit and receive capability is marked in a second FL capability flag bit of the resv message, and the label-based path calculation capability of the load distribution node is marked in a third FL capability flag bit. The third FL capability flag bit may be set through information of the load FL capability flag bit of the path message, and in the process of forwarding the resv message, the load distribution node does not process the third FL capability flag bit again; or the third FL capability flag bit may also be extended in the resv message by the load distribution node, and the load distribution node marks the local label-based path calculation in the third FL capability flag bit of the resv message, and then forwards the local label-based path calculation to the ingress node.

307: Receive the resv message sent by the egress node.

For example, the ingress node receives the resv message which is sent by the egress node to the ingress node through the load distribution node, and determines that the label-based path calculation function of the load distribution node is activated. The resv message includes the third FL capability flag bit.

308: Obtain the FL transmit and receive capability.

The ingress node obtains, from the second FL capability flag bit of the resv message, the FL transmit and receive capability of the egress node, and obtains, from the third FL capability flag bit of the resv message, the label-based path calculation capability of the load distribution node.

309: Determine an FL negotiation result.

For example, the ingress node judges, according to the FL capability of the local, the load distribution node, and the egress node, whether the path from the ingress node to the egress node supports the FL forwarding, if either the ingress node or the egress node does not support the FL transmit and receive capability, or the load distribution node does not have the label-based path calculation capability, the path from the ingress node to the egress node does not support the FL forwarding; and if both the ingress node and the egress node support the FL transmit and receive capability, and the load distribution node has the label-based path calculation capability, the path from the ingress node to the egress node supports the FL forwarding.

For example, in an actual application, multiple load distribution nodes may exist on an LSP, if both the ingress node and the egress node support the FL transmit and receive capability, when only one of the load distribution nodes has the label-based path calculation capability, the path of the LSP from the ingress node to the egress node supports the FL forwarding, but a specific effect of forwarding by using the FL is not very good; and when all load distribution nodes have the label-based path calculation capability, the path of the LSP from the ingress node to the egress node supports the FL forwarding, and the effect of forwarding by using the FL is very good.

In this embodiment of the present invention, the mechanism of collecting the FL function information of the load distribution node is provided, so that the ingress node learns the FL capability of the local, the load distribution node, and the egress node, so as to judge whether the use of the FL is supported on the corresponding LSP, and the case that the FL is used on the node that does not have the application function related to the FL, which causes a data packet forwarding error, may be eliminated, and therefore the FL may be used more properly and correctly.

The flow label negotiation method in this embodiment of the present invention is described from the perspective of the ingress node above, while a flow label negotiation method in an embodiment of the present invention is described from the perspective of a load distribution node below, and referring to FIG. 4, the flow label negotiation method in this embodiment of the present invention includes the following steps:

401: Receive a path message sent by an ingress node.

For example, a load distribution node receives an RSVP-TE path message sent by the ingress node, where the path message includes a first FL capability flag bit. The first FL capability flag bit marks an FL transmit and receive capability of the ingress node.

The load distribution node refers to a first node before branching, multi-path load distribution needs to be performed on the load distribution node, and an ECMP technology or a LAG technology may be used in the multi-path load distribution.

The ECMP technology refers to that load of a data packet may be distributed averagely to multiple links for transmission, and reaches the same destination node. The process of performing the multi-path distribution by using the ECMP technology is as follows: the load distribution node first performs a hash operation on each domain deciding a flow direction in a packet header (for example: cycle redundancy code check CRC16), obtains a key (key), divides a possible value space into N intervals, and distributes one of the intervals to each different next hop. In this way, the load distribution node may decide a node of the next hop according to an interval where the key is located.

The LAG technology refers to binding multiple ports with the same attribute in the same network into a port for use, where link redundancy and load balance may be achieved between two devices, and higher bandwidth may be provided. The process of performing the multi-path distribution by using the LAG technology is as follows: ports that need to be bound are selected according to a preset port attribute, where the port attribute may be a tuple key value.

402: Obtain the FL transmit and receive capability of the ingress node.

The load distribution node obtains, from the first FL capability flag bit of the path message, the FL transmit and receive capability of the ingress node.

In the process of performing the negotiation, if an FL-based path calculation function of the load distribution node is to be activated, the ingress node needs to be able to send the FL, and an egress node needs to be able to receive the FL; and therefore, when the path message passes through the load distribution node, the load distribution node needs to obtain the FL transmit and receive capability of the ingress node.

403: Forward the path message.

The load distribution node continues to forward the path message until the path message is forwarded to the egress node, and waits for the egress node to return a resv message.

For example, a specific implementation manner for forwarding the path message may be as follows: the load distribution node remains an original protocol processing process unchanged, and re-encapsulates a path message according to a format and content of the path message; the re-encapsulated path message carries a message that is in an original path message and needs to be notified to other nodes, and a forwarding address of the new path message is an address that is from the local node to a next hop node and recorded in the forward forwarding address. After the next node receives the path message, the received path message is also re-encapsulated before being forwarded to the next node, and the path message is forwarded in the foregoing manner until it is forwarded to the egress node.

404: Receive the resv message forwarded by the egress node.

The load distribution node receives the RSVP-TE resv message forwarded by the egress node, where the resv message includes a second FL capability flag bit. The second FL capability flag bit marks an FL transmit and receive capability of the egress node.

405: Obtain the FL transmit and receive capability of the egress node.

The load distribution node obtains, from the second FL capability flag bit of the resv message, the FL transmit and receive capability of the egress node.

In the process of performing the negotiation, if the FL-based path calculation function of the load distribution node is to be activated, the ingress node needs to be able to send the FL, and the egress node needs to be able to receive the FL; and therefore, when the resv message passes through the load distribution node, the load distribution node needs to obtain the FL transmit and receive capability of the egress node.

406: Set a path calculation method.

The load distribution node sets the path calculation method according to the foregoing FL transmit and receive capability of the ingress node obtained in step 402, and the transmit and receive capability of the egress node obtained in step 405.

When the load distribution node branches along a direction from the ingress node to the egress node, if the ingress node supports FL sending and the egress node supports FL receiving, local path calculation along the direction from the ingress node to the egress node is set as label-based path calculation.

When the load distribution node branches along a direction from the egress node to the ingress node, if the egress node supports the FL sending and the ingress node supports the FL receiving, the local path calculation along the direction from the egress node to the ingress node is set as the label-based path calculation.

The foregoing path calculation refers to calculation where the load distribution node performs the multi-path load distribution, and the label-based path calculation refers to calculation where a value of the FL (or information related to the FL) is used as an input parameter of the path calculation.

For example, if the load distribution node uses the ECMP technology to perform the multi-path distribution, the value of the FL is substituted in a local hash function for operation, so as to obtain a key value, and in performing the multi-path distribution, the load is shared to a transmission path which the key value is mapped to; and if the load distribution node uses the LAG technology to perform the multi-path distribution, the value of the FL is used as an attribute parameter of the ports that need to be distributed, and several ports with the same port attribute are bound into a port for load sharing.

407: Forward the resv message.

The load distribution node continues to forward the resv message to the ingress node, until the resv message is forwarded to the ingress node, and the FL negotiation is completed.

In this embodiment of the present invention, the load distribution node obtains the FL transmit and receive capability of the ingress node and the egress node, and sets the local path calculation along the direction from the ingress node to the egress node (or the direction from the egress node to the ingress node) as the label-based path calculation according to the FL transmit and receive capability of the foregoing two nodes; so that when the data packet carrying the FL passes through the local, it may be guaranteed that the data packets of the same data flow are forwarded through the same path, which may not cause a disorder.

Figure 5:
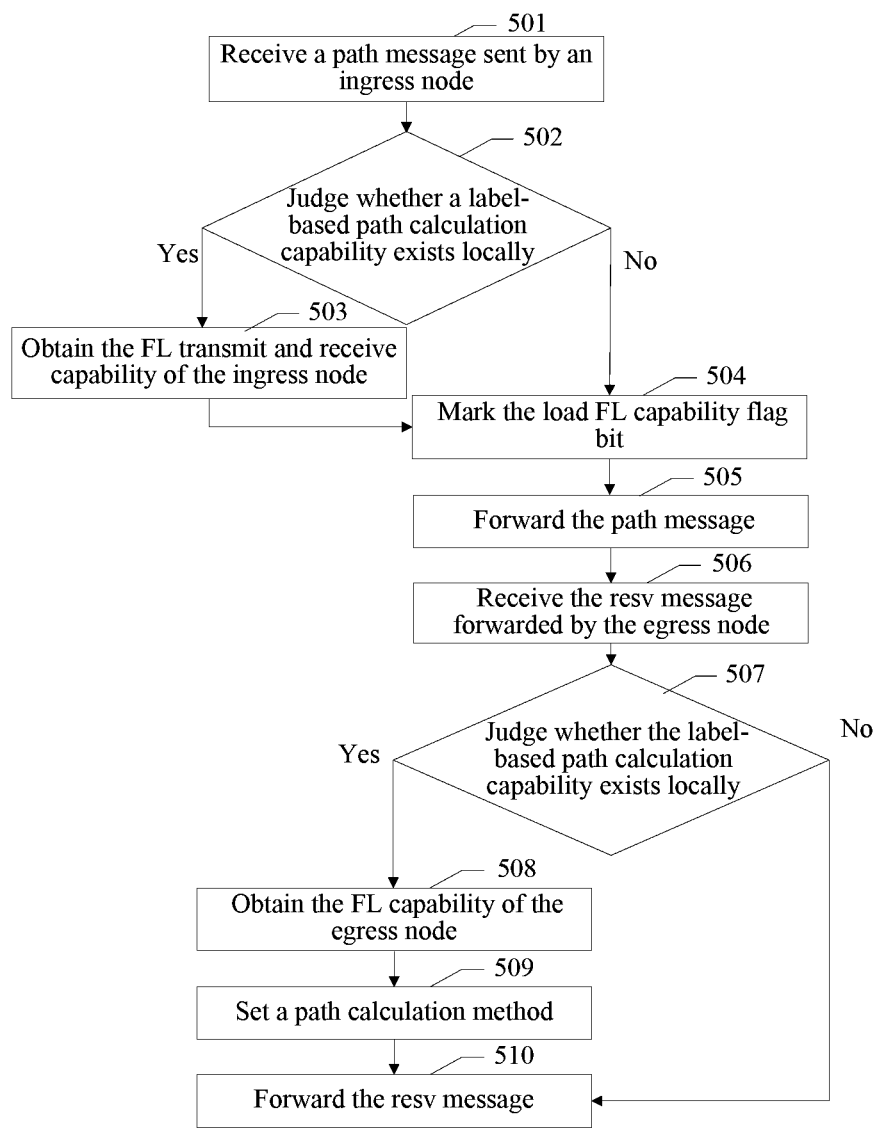
FIG. 5 is a simplified schematic flow chart of a flow label negotiation method according to another embodiment of the present invention.

In commonly used network devices at present, a load distribution node may not have an application function related to an FL, but the present invention also provides a corresponding processing mechanism, and referring to FIG. 5, a flow label negotiation method in this embodiment of the present invention includes:

501: Receive a path message sent by an ingress node.

A load distribution node receives the path message sent by the ingress node, for example the path message includes a first FL capability flag bit and an FLI add flag bit.

The first FL capability flag bit is used for marking an FL transmit and receive capability of the ingress node.

502: Judge whether a label-based path calculation capability exists locally;

The load distribution node adds a load FL capability flag bit in the path message.

The load FL capability flag bit is used for marking a label-based path calculation capability of the load distribution node, multiple load FL capability flag bits may exist, which mark the label-based path calculation of different load distribution nodes, and specifically a local node identifier ID or an interface identifier ID may be recorded through an extended TLV field, so as to distinguish different load distribution nodes.

The load distribution node judges whether the label-based path calculation capability exists locally, if yes, triggers step 503, and triggers step 504 to mark the load FL capability flag bit according to the local FL capability; and if not, triggers step 504 to mark the load FL capability flag bit according to the local FL capability.

In this embodiment of the present invention, besides marking the local label-based path calculation capability in the path message, a third FL capability flag bit may also be added in a resv message when the resv message is received, and the local label-based path calculation capability is marked in the third FL capability flag bit, and then the local label-based path calculation capability is notified to the ingress node through the resv message, and a specific method is adopted according to an actual situation, which is not limited here.

In the present invention, a new object (object): a flow label object (FL object) is defined in the path message; the FL object may have a TLV format, and carries the FL capability information of the ingress node; when a node on the LSP receives the path message carrying the FL object, if the FL object in the path message cannot be identified, corresponding processing is not performed on the local according to the content of the FL object, and at the same time it may be judged that the node does not support the application function related to the FL.

503: Obtain the FL transmit and receive capability of the ingress node.

The load distribution node obtains, from the first FL capability flag bit of the path message, the FL transmit and receive capability of the ingress node.

504: Mark the load FL capability flag bit.

If the label-based path calculation capability exists locally, the load distribution node marks the load FL capability flag bit of a corresponding node ID in the path message as yes; and if the label-based path calculation capability does not exist locally, the load distribution node marks the load FL capability flag bit of the corresponding node ID in the path message as no, and triggers step 505 to directly perform transparent forwarding.

505: Forward the path message.

The load distribution node forwards the path message where the load FL capability flag bit is marked, until the path message is forwarded to the egress node, and waits for the egress node to return the resv message.

506: Receive the resv message forwarded by the egress node.

Figure 4:
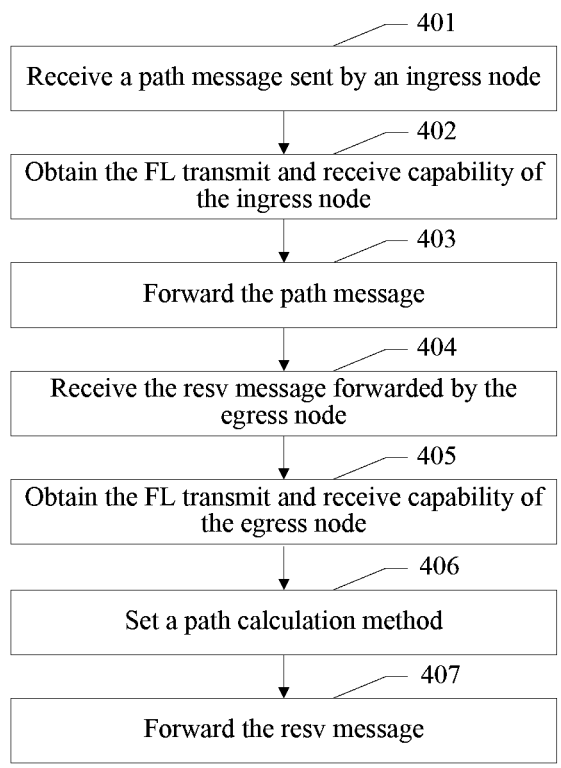
FIG. 4 is a simplified schematic flow chart of a flow label negotiation method according to another embodiment of the present invention.

Content of step 506 in this embodiment is the same as the content of step 404 in the foregoing embodiment shown in FIG. 4, and is not described here again.

507: Judge whether the label-based path calculation capability exists locally.

The load distribution node judges whether the label-based path calculation capability exists locally; if yes, triggers step 508; and if not, triggers step 510 to directly perform the transparent forwarding.

508: Obtain the FL transmit and receive capability of the egress node.

Content of step 508 in this embodiment is the same as the content of step 405 in the foregoing embodiment shown in FIG. 4, and is not described here again.

509: Set a path calculation method.

Content of step 509 in this embodiment is the same as the content of step 406 in the foregoing embodiment shown in FIG. 4, and is not described here again.

510: Forward the resv message.

Content of step 510 in this embodiment is the same as the content of step 407 in the foregoing embodiment shown in FIG. 4, and is not described here again.

In this embodiment of the present invention, a judgment mechanism of the local label-based path calculation capability is added in the load distribution node, if the local does not support the application function related to the FL, the path message (or the resv message) is directly transparently forwarded to a next node, and the local FL capability information is recorded at the same time, so that the negotiation process can be successfully completed, and also the ingress node can obtain the FL capability information of the load distribution node, and makes a correct judgment on the use of the FL.

Figure 6:
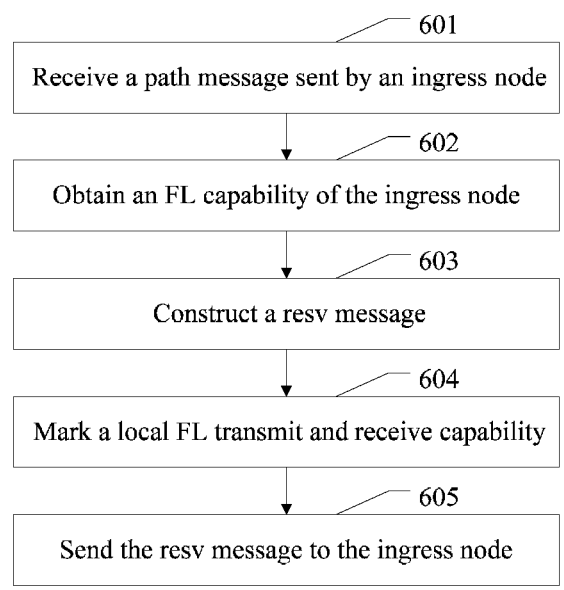
FIG. 6 is a simplified schematic flow chart of a flow label negotiation method according to another embodiment of the present invention.

The flow label negotiation method in this embodiment of the present invention is described from the perspective of the ingress node and the load distribution node above, while a flow label negotiation method in an embodiment of the present invention is described from the perspective of an egress node below, and referring to FIG. 6, the flow label negotiation method in this embodiment of the present invention includes:

601: Receive a path message sent by an ingress node.

An egress node receives an RSVP-TE path message which is sent by the ingress node through a load distribution node, where the path message includes a first FL capability flag bit.

602: Obtain an FL transmit and receive capability of the ingress node.

The egress node obtains, from the first FL capability flag bit of the path message, the FL transmit and receive capability of the ingress node, and determines that the ingress node may identify an FL.

603: Construct a resv message.

For example, the egress node constructs the resv message at an RSVP-TE standard according to the path message, where the resv message includes a second FL capability flag bit.

604: Mark a local FL transmit and receive capability.

The egress node marks the FL transmit and receive capability by using the second FL capability flag bit of the resv message.

In an FL negotiation process of an LSP, the load distribution node needs to obtain the FL transmit and receive capability of the egress node, so as to enable an FL identification function of the load distribution node.

605: Send the resv message to the ingress node.

The egress node sends the resv message to the ingress node through the load distribution node, and the local FL negotiation ends.

In this embodiment of the present invention, the egress node responds to the FL negotiation initiated by the ingress node, returns the resv message to the ingress node through the load distribution node, and enables the FL identification function of the load distribution node, thereby guaranteeing that the FL is correctly used in a multi-path LSP forwarding process.

Figure 7:
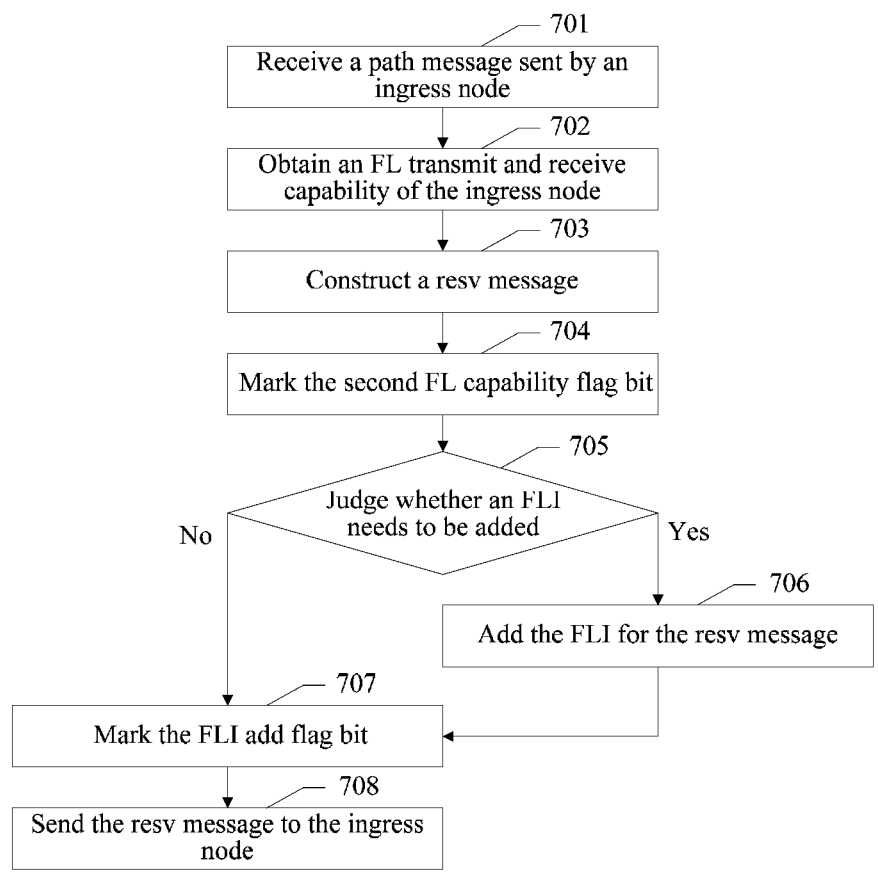
FIG. 7 is a simplified schematic flow chart of a flow label negotiation method according to another embodiment of the present invention.

Referring to FIG. 7, a flow label negotiation method in an embodiment of the present invention includes:

701: Receive a path message sent by an ingress node.

An egress node receives the path message which is sent by the ingress node through the load distribution node, for example, the path message includes a first FL capability flag bit, an FLI add flag bit, and a load FL capability flag bit.

The load FL capability flag bit is used for marking a label-based path calculation capability of the load distribution node, multiple load FL capability flag bits may exist, which mark the label-based path calculation capability of different load distribution nodes, and specifically a local node identifier ID or an interface identifier ID may be recorded through an extended TLV field, so as to distinguish different load distribution nodes.

702: Obtain an FL transmit and receive capability of the ingress node.

The egress node obtains, from the first FL capability flag bit of the path message, the FL transmit and receive capability of the ingress node, and determines that the ingress node may identify an FL.

703: Construct a resv message.

The egress node constructs the resv message at an RSVP-TE standard according to the path message, for example, the resv message includes a second FL capability flag bit, and the FLI add flag bit, and a third FL capability flag bit.

The second FL capability flag bit is used for marking the FL transmit and receive capability of the egress node.

For example, the second FL capability flag bit may be stored in the extended TLV field of the resv message, and if the resv message is only used for FL negotiation, namely, the resv message only stores indicator information of each flag bit, the second FL capability flag bit may be stored in a resv field in the original resv message, and the TLV field does not have to be extended. The second FL capability flag bit is used for marking the FL transmit and receive capability of a node, and specifically may be divided into an FL receive capability label and an FL transmit capability label.

For example, the third FL capability flag bit is used for marking the label-based path calculation capability of the load distribution node, and multiple third FL capability flag bits may exist, which mark the label-based path calculation capability of different load distribution nodes respectively. The third FL capability flag bit may be set by the egress node according to information in the load FL capability flag bit; or may also be extended in the resv message by the load distribution node, and the load distribution node marks the local label-based path calculation in the third FL capability flag bit of the resv message, and specific implementation is made according to an actual situation, which is not limited here.

704: Mark the second FL capability flag bit.

The ingress node marks the local FL transmit and receive capability by using the second FL capability flag bit in the resv message, so that the load distribution node and the ingress node through which the resv message passes can obtain the FL transmit and receive capability of the egress node, and after the load distribution node obtains the FL transmit and receive capability of the egress node, the FL identification function of the load distribution node is enabled.

705: Judge whether an FLI needs to be added.

The egress node judges whether the FLI needs to be added in the resv message, if yes, triggers step 706, and triggers step 707 to mark the FLI add flag bit as yes; and if not, triggers step 707 to mark the FLI add flag bit as no.

For example, a judgment manner may be as follows: the ingress node detects whether an application label exists in a network of the data packet forwarding (for example, a PW label), if yes, the FLI does not need to be added for the resv message; and if not, the FLI needs to be added for the resv message.

706: Add the FLI for the resv message.

The egress node adds the FLI for the resv message, so that the node in the LSP can determine the type of the FL, thus in the data packet forwarding after the FL negotiation, the end node of the LSP can identify the FL in the packet, and correct processing is performed on the data packet carrying the FL.

707: Mark the FLI add flag bit.

The ingress node, according to the foregoing judgment result of step 705, marks the FLI add flag bit as no if the FLI does not need to be added for the resv message; and marks the FLI add flag bit as yes if the FLI needs to added for the resv message.

708: Send the resv message to the ingress node.

The egress node sends the resv message to the ingress node through the load distribution node, and the local FL negotiation ends.

In this embodiment of the present invention, the mechanism of collecting the label-based path calculation capability of the load distribution node is added, so that the ingress node may correctly use the FL according to the FL capability of each node on the LSP; in addition, the mechanism of adding the FLI for the resv message is further added, so that when the network of the service transmission does not have the application label, the end port in the LSP can determine the type of the FL, and in the data packet forwarding after the FL negotiation, before the forwarding to a network outside the LSP is performed by the end node of the data packet LSP, the FL in the packet can be removed, and therefore forwarding the FL to a receiving end system is avoided.

Figure 8:
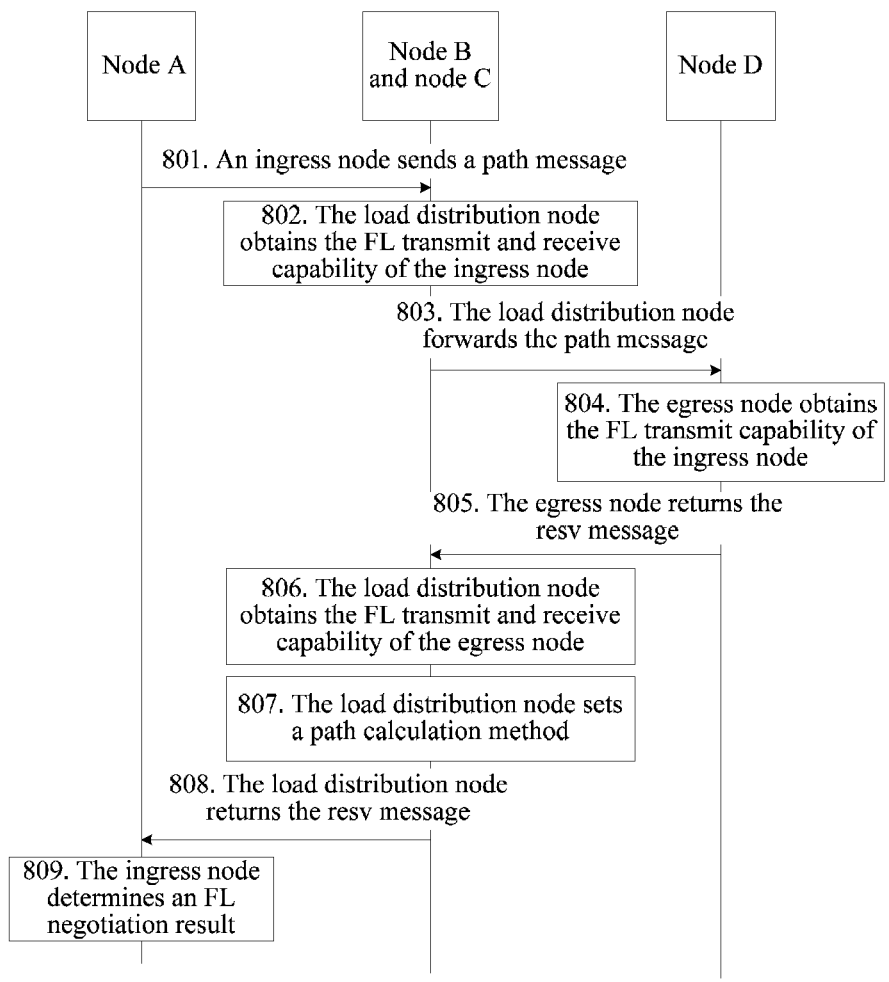
FIG. 8 is a schematic flow chart of simplified signaling of a flow label negotiation method according to an embodiment of the present invention.

For the convenience of understanding, the method in the foregoing embodiments is further described in detail with a specific application scenario, and referring to FIG. 8, the method specifically includes:

801: An ingress node sends a path message.

A node A establishes an LSP according to an RSVP-TE standard, and the node A constructs the path message according to the RSVP-TE standard, where the path message includes: an FL transmit capability flag bit T, an FL receive capability flag bit R, an FLI add flag bit I, and a forwarding path of the path message.

Figure 9:
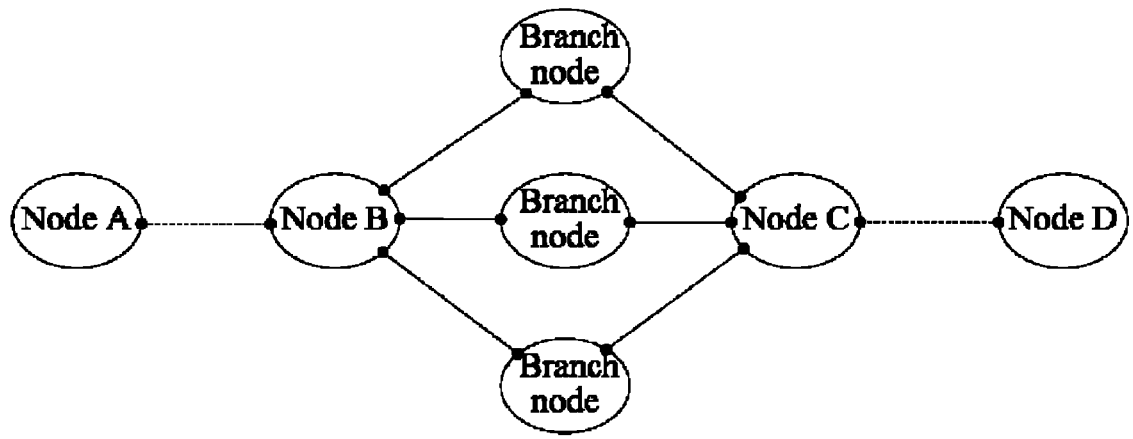
FIG. 9 is a schematic structural diagram of an ingress node, a load distribution node, and an egress node according to an embodiment of the present invention.

Referring to FIG. 9, in the forwarding path, a destination node of the node A is a node D, when two intermediate nodes (a node B and a node C) are passed through, ECMP load sharing is performed; and therefore, the node A is an ingress node on the LSP, the node B and the node C are load distribution nodes on the LSP, and the node D is an egress node on the LSP.

T: T=0, means that a sending end does not support FL sending; and T=1 means that the sending end supports the FL sending.

R: R=0, means that a receiving end does not support FL receiving; and R=1, means that the receiving end supports the FL receiving.

I: When an FLI is added in the path message, the flag bit is set to "1", and when no FLI is added in the path message, the flag bit is set to "0".

The flag bits such as the T, R, and I are data structures that are extended, with a TLV format, in an LSP Attribute object field of the path message.

When the flag bit I is "1", the FLI needs to be extended in the FL object, so that when the application label does not exist in the network of the service transmission, the end nodes (the node A and the node B in this application example) in the LSP can determine the type of the FL, and in the data packet forwarding after the FL negotiation, before the forwarding to the network outside the LSP is performed by the end nodes of the service packet LSP, the FL in the packet can be removed, and therefore forwarding the FL to the receiving terminal system is avoided.

After constructing the path message, the node A marks the flag bits such as the T, R, and I according to the local FL capability, and sends the path message to the node D through the node B and the node C, and performs the FL negotiation.

802: The load distribution node obtains the FL transmit and receive capability of the ingress node.

When the path message sent by the node A passes through the node B or the node C, the node B or the node C, as the load distribution node, first judges whether a label-based path calculation capability exists locally; if yes, obtains, from the flag bits T and R of the path message, the FL transmit and receive capability of the node A, stores the FL transmit and receive capability in the local, waits for the node D to return a resv message, and then judges, according to the FL transmit and receive capability of the two end nodes, whether the label-based path calculation function is activated; and records the local label-based path calculation capability in the path message; and if not, records the local label-based path calculation capability in the path message, and trigger step 803 to perform transparent forwarding on the path message.

803: The load distribution node forwards the path message.

After the node B or the node C performs related processing according to the local FL capability, the node B or the node C continues to forward the path message to the node D according to the forwarding path.

804: The egress node obtains the FL transmit capability of the ingress node.

The node D, after receiving the path message, first obtains, from the flag bits T and R of the path message, the FL transmit and receive capability of the node A, and determines that the node A may identify the FL.

Then the node D constructs the resv message at the RSVP-TE standard according to the path message; where the resv message includes: the FL transmit capability flag bit T, the FL receive capability flag bit R, the FLI add flag bit I, and a forwarding path returned by the resv message, and the destination node is the node A, and when the two intermediate nodes (the node B and the node C) are passed through, the ECMP load sharing is performed.

805: The egress node returns the resv message.

After constructing the resv message, the node D marks the flag bits such as the T, R, and I according to the local FL capability, and marks the flag bits T and R of the node B and the node C in the resv message according to the flag bits T and R of the node B and the node C in the path message; and then sends the resv message to the node A through the node B and the node C, so as to activate the label-based path calculation function of the node B or the node C.

806: The load distribution node obtains the FL transmit and receive capability of the egress node.

When the resv message sent by the node D passes through the node B or the node C, the node B or the node C first judges whether the FL transmit and receive capability exists locally; if yes, obtains, from the flag bits T and R of the resv message, the FL transmit and receive capability of the node D, and stores the FL transmit and receive capability in the local; and if not, triggers step 808 to perform the transparent forwarding on the resv message.

807: The load distribution node sets a path calculation method.

If the node B detects that the node A has the FL transmit capability, and the node D has the FL receive capability, the local path calculation along the forwarding path is set as the label-based path calculation.

If the node C detects that the node D has the FL transmit capability, and the node A has the FL receive capability, the local path calculation along the forwarding path in the opposite direction is set as the label-based path calculation.

The label-based path calculation may be as follows: first a hash operation is performed on each domain that decides a flow direction in a packet header (a value of the FL is used for substitution into a local hash function for operation), a key is obtained, a possible value space of the key is divided into N paths, and each key value is mapped to a path of a branch node, and in this way, the load distribution node may decide a node of a next hop according to a path where the key is located.

808: The load distribution node returns the resv message.

After the node B or the node C performs the related processing according to the local FL capability, the node B or the node C continues to forward the resv message to the node A.

809: The ingress node determines an FL negotiation result.

The node A receives the resv message, obtains, from a corresponding flag bit of the resv message, the FL transmit and receive capability of the node D, and judges, according to the FL transmit and receive capability of the local and the node D, whether the forwarding path supports the FL forwarding, if either the local or the node D does not support the FL transmit and receive capability, the forwarding path does not support the FL forwarding; and if both the local and the node D support the FL transmit and receive capability, the forwarding path supports the FL forwarding.

The application scenario of the embodiment of the present invention is illustrated through some examples, and it may be understood that, in actual applications, more application scenarios may exist, which are not specifically limited here.

Figure 10:
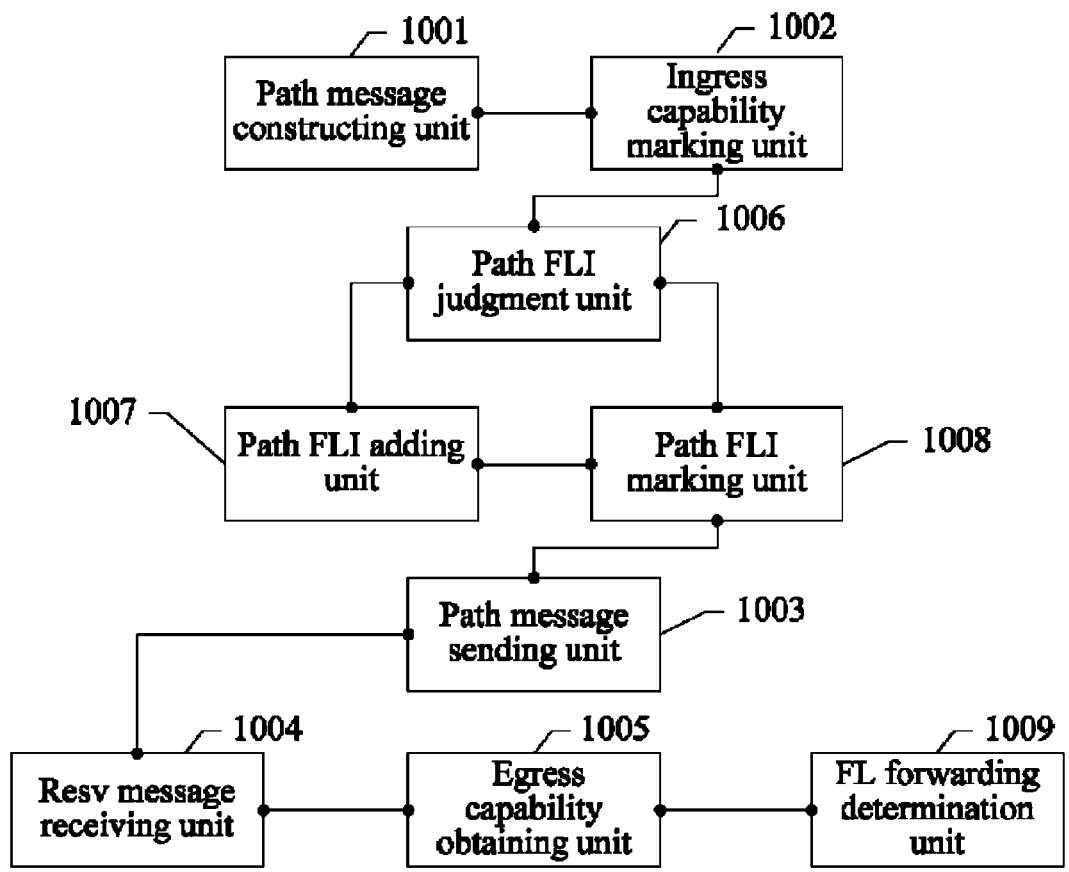
FIG. 10 is a schematic diagram of a logical structure of an ingress node according to an embodiment of the present invention.

An ingress node of an embodiment of the present invention used for executing the foregoing flow label negotiation method is described below, and referring to FIG. 10 for a logical structure of the ingress node, the ingress node in this embodiment of the present invention includes:

a path message constructing unit 1001, configured to construct an RSVP-TE path message, where the path message includes a first flow label FL capability flag bit;

an ingress capability marking unit 1002, configured to mark a local FL transmit and receive capability in the first FL capability flag bit;

a path message sending unit 1003, configured to send the path message to an egress node through a load distribution node, and perform FL negotiation;

a resv message receiving unit 1004, configured to receive the resv message which is sent by the egress node through the load distribution node, where the resv message includes a second FL capability flag bit; and an egress capability obtaining unit 1005, configured to obtain, from the resv message, an FL transmit and receive capability of the egress node, and complete the FL negotiation.

The ingress node of this embodiment of the present invention may further include:

a path FLI judgment unit 1006, configured to judge whether an FLI needs to be added for the path message, if yes, trigger a path FLI adding unit, and trigger a path FLI marking unit to mark the FLI add flag bit as yes; and if not, trigger the path FLI marking unit to mark the FLI add flag bit as no;

the path FLI adding unit 1007, configured to add the FLI in a TLV field of the path message;

the path FLI marking unit 1008, configured to mark whether the FLI is added in the path message; and an FL forwarding determination unit 1009, configured to judge, according to the first FL capability flag bit and the second FL capability flag bit, whether a path from the ingress node to the egress node supports FL forwarding; where if either the ingress node or the egress node does not have the FL transmit and receive capability, the path from the ingress node to the egress node does not support the FL forwarding; and if both the ingress node and the egress node have the FL transmit and receive capability, the path from the ingress node to the egress node supports the FL forwarding.

In this embodiment of the present invention, an interaction process between the units of the ingress node is as follows:

The path message constructing unit 1001 constructs the path message according to the RSVP-TE standard, where the path message includes the first FL capability flag bit and an FLI add flag bit.

After the path message constructed is completed, each corresponding flag bit is marked: the ingress capability marking unit 1002 marks the local FL transmit and receive capability, so that the load distribution node and the egress node through which the path message passes can obtain the FL transmit and receive capability of the ingress node. The path FLI judgment unit 1006 judges whether the FLI needs to be added in the path message, if yes, triggers the path FLI marking unit 1008 to mark the FLI add flag bit as yes, and triggers the path FLI adding unit 1007 to add the FLI for the path message; and if not, triggers the path FLI marking unit 1008 to mark the FLI add flag bit as no.

After the flag bits are completely marked, the path message sending unit 1003 sends the path message to the egress node through the load distribution node, and performs the FL negotiation;

After the path message is sent, the resv message receiving message 1004 receives the resv message which is sent by the egress node to the ingress node through the load distribution node, and determines that a label-based path calculation function of the load distribution node is activated. The resv message includes the second FL capability flag bit and a third FL capability flag bit, the third FL capability flag bit is used for marking whether the load distribution node has the label-based path calculation capability; and the egress capability obtaining unit 1005 obtains, from the second FL capability flag bit of the resv message, the FL transmit and receive capability of the egress node.

The FL forwarding determination unit 1009 judges, according to the first FL capability flag bit, the second FL capability flag bit and the third FL capability flag bit, whether the path between the ingress node and the egress node supports the FL forwarding. For example, if either the ingress node or the egress node does not support the FL transmit and receive capability, or the load distribution node does not have the label-based path calculation capability, the path between the ingress node and the egress node does not support the FL forwarding; and if both the ingress node and the egress node support the transmit and receive capability, and the load distribution node has the label-based path calculation capability, the path between the ingress node and the egress node supports the FL forwarding.

Figure 11:
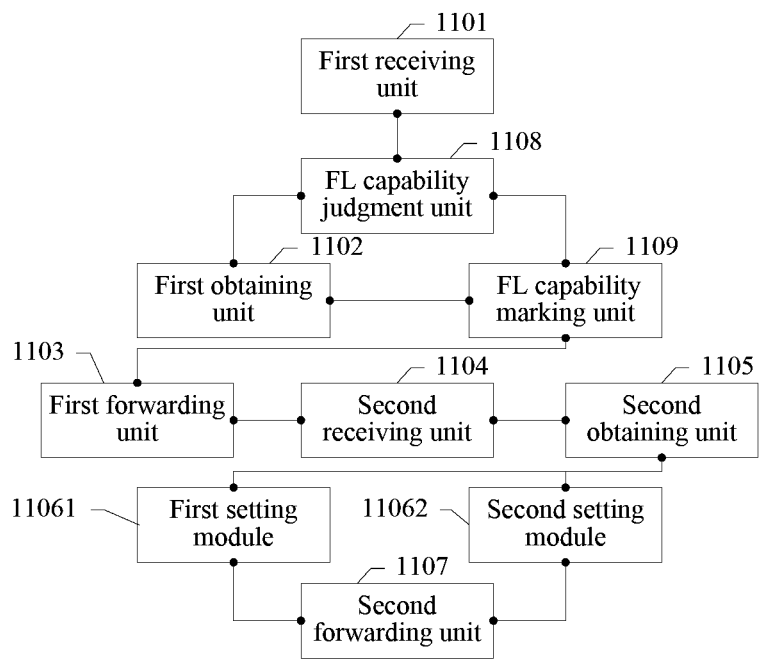
FIG. 11 is a schematic diagram of a logical structure of a load distribution node according to an embodiment of the present invention.

A load distribution node of an embodiment of the present invention used for executing the foregoing flow label negotiation method is described below, and referring to FIG. 11 which is a logical structure of the load distribution node, the load distribution node in this embodiment of the present invention includes:

a first receiving unit 1101, configured to receive an RSVP-TE path message sent by an ingress node, where the path message includes a first FL capability flag bit;

a first obtaining unit 1102, configured to obtain, from the first FL capability flag bit, an FL transmit and receive capability of the ingress node;

a first forwarding unit 1103, configured to continue to forward the path message to an egress node;

a second receiving unit 1104, configured to receive an RSVP-TE resv message forwarded by the egress node, where the resv message includes a second FL capability flag bit;

a second obtaining unit 1105, configured to obtain, from the second FL capability flag bit, an FL transmit and receive capability of the egress node;

a setting unit 1106, configured to judge, according to the FL transmit and receive capability of the ingress node and the egress node, whether local path calculation is set as label-based path calculation; and a second forwarding unit 1107, configured to continue to forward the resv message to the ingress node.

In this embodiment of the present invention, the setting unit 1106 may include:

a first setting module 11061, configured to: if the ingress node supports FL sending and the egress node supports FL receiving, set the local path calculation along a direction from the ingress node to the egress node as the label-based path calculation; and a second setting module 11062, configured to: if the egress node supports FL sending and the ingress node supports FL receiving, set the local path calculation along a direction from the egress node to the ingress node as the label-based path calculation.

In this embodiment of the present invention, the load distribution node may further include:

an FL capability judgment unit 1108, configured to judge whether a label-based path calculation capability exists locally, if yes, trigger the first obtaining unit, and trigger the FL capability marking unit to mark the load FL capability flag bit according to the local FL capability; and if not, trigger the FL capability marking unit to mark the load FL capability flag bit according to the local FL capability, and trigger the first forwarding unit; and an FL capability marking unit 1109, configured to mark whether the label-based path calculation exists locally.

In this embodiment of the present invention, an interaction process between the units of the load distribution node is as follows:

The first receiving unit 1101 receives the path message sent by the ingress node, where the path message includes the first FL capability flag bit and an FLI add flag bit.

After the path message is received, the FL capability judgment unit 1108 judges whether the label-based path calculation capability exists locally, for example, if yes, triggers the first obtaining unit 1102 to obtain, from the first FL capability flag bit of the path message, the FL transmit and receive capability of the ingress node, triggers the FL capability marking unit 1109 to add a load FL capability flag bit, and marks the load FL capability flag bit of a corresponding node ID in the path message as yes; and if not, triggers the FL capability flag bit 1109 to add the load FL capability flag bit, marks the load FL capability flag bit of the corresponding node ID in the path message as no, and triggers the first forwarding unit 1103 to directly transparently forward the path message.

After the local label-based path calculation is marked, the first forwarding unit 1103 forwards the path message where the load FL capability flag bit is marked, until the path message is forwarded to the egress node, and waits for the egress node to return the resv message. The second receiving unit 1104 receives the resv message forwarded by the egress node, where the resv message includes the second FL capability flag bit. The second FL capability flag bit marks the FL transmit and receive capability of the egress node. The second obtaining unit 1105 obtains, from the second FL capability flag bit of the resv message, the FL transmit and receive capability of the egress node, and performs judgment according to the FL transmit and receive capability of the ingress node and the egress node, when the load distribution node branches along a direction from the ingress node to the egress node, if the ingress node supports the FL sending and the egress node supports the FL receiving, triggers the first setting module 11061 to set the local path calculation along the direction from the ingress node to the egress node as the label-based path calculation; and when the load distribution node branches along a direction from the egress node to the ingress node, if the egress node supports the FL sending and the ingress node supports the FL receiving, triggers the second setting module 11062 to set the local path calculation along the direction from the egress node to the ingress node as the label-based path calculation.

After the FL transmit and receive capability of the egress node is obtained, or when the local does not support the FL transmit and receive capability, the second forwarding unit 1107 continues to forward the resv message to the ingress node, until the resv message is forwarded to the ingress node, and completes the FL negotiation.

Figure 12:
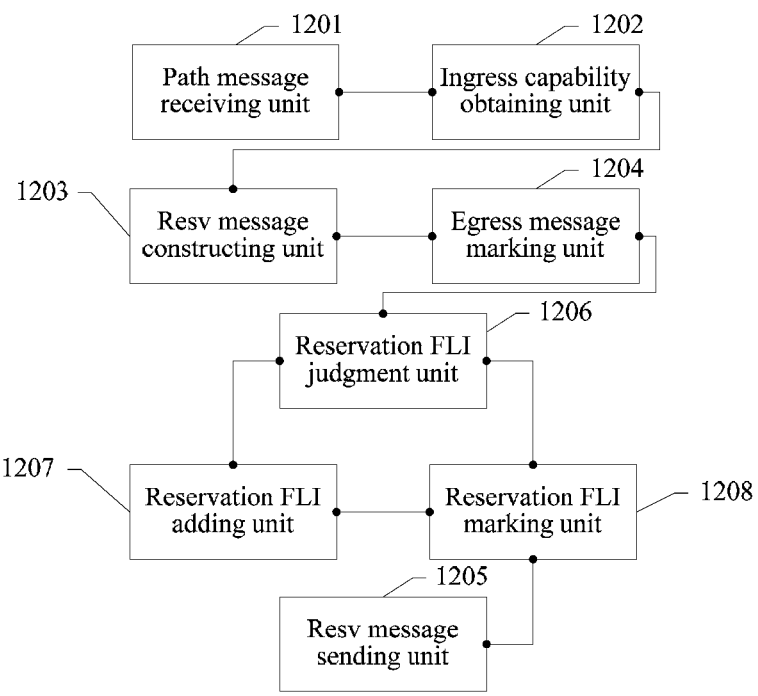
FIG. 12 is a schematic diagram of a logical structure of an egress node according to an embodiment of the present invention.

An egress node of an embodiment of the present invention used for executing the foregoing flow label negotiation method is described below, and referring to FIG. 12 which is a logical structure of the egress node, the egress node in this embodiment of the present invention includes:

a path message receiving unit 1201, configured to receive an RSVP-TE path message which is sent by an ingress node through a load distribution node, where the path message includes a first FL capability flag bit;

an ingress capability obtaining unit 1202, configured to obtain, from the first FL capability flag bit, an FL transmit and receive capability of the ingress node;

a resv message constructing unit 1203, configured to construct an RSVP-TE resv message according to the path message, where the resv message includes a second FL capability flag bit;

an egress capability marking unit 1204, configured to mark a local FL transmit and receive capability in the second FL capability flag bit; and a resv message sending unit 1205, configured to send the resv message to the ingress node through the load distribution node.

In this embodiment of the present invention, the egress node may further include:

a reservation FLI judgment unit 1206, configured to judge whether an FLI needs to be added for the resv message, if yes, trigger a reservation FLI adding unit, and trigger a reservation FLI marking unit to mark the FLI add flag bit as yes; and if not, trigger the reservation FLI marking unit to mark the FLI add flag bit as no;

the reservation FLI adding unit 1207, configured to add the FLI in a TLV field of the resv message; and the reservation FLI marking unit 1208, configured to mark whether the FLI is added in the resv message.

In this embodiment of the present invention, an interaction process between the units of the egress node is as follows:

The path message receiving unit 1201 receives the path message which is sent by the ingress node through the load distribution node, where the path message includes: the first FL capability flag bit, the FLI add flag bit, and the load FL capability flag bit. The first FL capability flag bit is used for marking the FL transmit and receive capability of the ingress node; and the load FL capability flag bit is used for marking the label-based path calculation capability of the load distribution node, and multiple load FL capability flag bits may exist, which mark the label-based path calculations of different load distribution nodes respectively.

For example, after the path message is received, the ingress capability obtaining unit 1202 obtains, from a third FL capability flag bit of the path message, the FL transmit and receive capability of the ingress node, determines that the ingress node may identify the FL, and triggers the resv message constructing unit 1203 to construct the resv message at the RSVP-TE standard according to the path message, where the resv message includes: the second FL capability flag bit, the FLI add flag bit, and the third FL capability flag bit. The third FL capability flag bit is set according to the load FL capability flag bit; and the second FL capability flag bit is used for marking the FL transmit and receive capability of the egress node.

After the resv message is constructed, the egress capability marking unit 1204 marks the local FL transmit and receive capability by using the second FL capability flag bit in the resv message, so that the load distribution node and the ingress node through which the resv message passes can obtain the FL transmit and receive capability of the egress node, and after the load distribution node obtains the FL transmit and receive capability of the egress node, the FL identification function of the load distribution node is enabled. The reservation FLI judgment unit 1206 judges whether an FLI needs to be added for the resv message, if yes, triggers the reservation FLI adding unit 1207 to add the FLI for the resv message, and triggers the reservation FLI marking unit 1208 to mark the FLI add flag bit as yes; and if not, triggers the reservation FLI marking unit 1208 to mark the FLI add flag bit as no.

After each related flag bit is completely marked, the resv message sending unit 1205 sends the resv message to the ingress node through the load distribution node, and the local FL negotiation ends.

Figure 13:
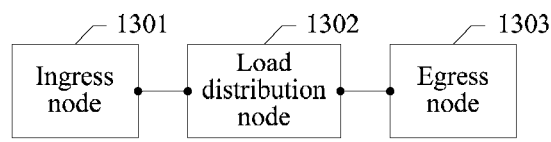
FIG. 13 is a schematic diagram of a logical structure of a flow label negotiation system according to an embodiment of the present invention.

An flow label negotiation system of an embodiment of the present invention used for executing the foregoing flow label negotiation method is described below, and referring to FIG. 13 which is a logical structure of the flow label negotiation system, the flow label negotiation system of this embodiment of the present invention includes:

an ingress node 1301, configured to construct a path message, where the path message includes a first FL capability flag bit; mark a local FL transmit and receive capability by using the first FL capability flag bit; send the path message to an egress node through a load distribution node, and perform FL negotiation; receive a resv message which is sent by the egress node through the load distribution node; and obtain, from the resv message, an FL transmit and receive capability of the egress node, and complete the FL negotiation;

the load distribution node 1302, configured to receive the path message sent by the ingress node, where the path message includes the first FL capability flag bit; obtain, from the first FL capability flag bit, the FL transmit and receive capability of the ingress node; continue to forward the path message to the egress node; receive the resv message forwarded by the egress node, where the resv message includes a second FL capability flag bit; obtain, from the second FL capability flag bit, the FL transmit and receive capability of the egress node; if the ingress node supports the FL sending and the egress node supports the FL receiving, set local path calculation along a direction from the ingress node to the egress node as label-based path calculation; or if the egress node supports the FL sending and the ingress node supports the FL receiving, set the local path calculation along a direction from the egress node to the ingress node as the label-based path calculation; and continue to forward the resv message to the ingress node; and the egress node 1303, configured to receive the path message which is sent by the ingress node through the load distribution node, where the path message includes the first FL capability flag bit; obtain, from the first FL capability flag bit, the FL transmit and receive capability of the ingress node; construct the resv message according to the path message, where the resv message includes the second FL capability flag bit; mark the local FL transmit and receive capability by using the second FL capability flag bit of the resv message; and send the resv message to the ingress node through the load distribution node.

For example, the foregoing flow label negotiation system may be applied in the scenario described in the application example of FIG. 8.

Persons skilled in the art may understand that all or part of the steps of the method according to the embodiments may be implemented by a program instructing relevant hardware. The program may be stored in a computer readable storage medium, and the storage medium may be a read-only memory, a magnetic disk, or an optical disk, and the like.

The flow label negotiation method, the related device, and the system provided by the present invention are described in detail in the foregoing. To persons skilled in the art, changes may be made on both a specific implementation manner and an application range according to the idea of the embodiments of the present invention. In conclusion, the specification should not be understood as a limitation to the present invention.

What is claimed is:

1. A method performed by an ingress node for negotiating a flow label (FL) processing capability, comprising:
    constructing a resource reservation protocol-traffic engineering (RSVP-TE) path message, wherein the RSVP-TE path message comprises a first FL capability flag bit indicating whether the ingress node is configured to process an FL carried in a packet received from an egress node;
    sending the RSVP-TE path message to the egress node;
    receiving an RSVP-TE resv message in response to the RSVP-TE path message, wherein the RSVP-TE resv message comprises a second FL capability flag bit indicating whether the egress node is configured to process an FL carried in a packet generated by the ingress node;
    obtaining, from the second FL capability flag bit an indication whether the egress node can process the FL carried in the packet received from the ingress node.

2. The method according to claim 1, wherein the RSVP-TE path message is sent to the egress node through a load distribution node and the RSVP-TE resv message is received through the load distribution node; and
    wherein the first FL capability flag bit further indicates whether the ingress node is configured to insert an FL in a packet to be sent to the egress node; and the second FL capability flag bit further indicates whether the egress node is configured to insert an FL in a packet to be sent to the ingress node.

3. The method according to claim 2, wherein the constructing the RSVP-TE path message comprises:
adding a type length value (TLV) field in an object field of the RSVP-TE path message; and
storing the first FL capability flag bit in the TLV field; or
adding a resv field in an object field of the RSVP-TE path message; and
storing the first FL capability flag bit in the resv field.

4. The method according to claim 2, wherein the RSVP-TE path message further comprises a flow label indicator (FLI) flag bit when an FLI has been added to the RSVP-TE message; and
before the sending the RSVP-TE path, the method further comprises:
determining whether an FLI is to be added to the RSVP-TE path message and, in instances where the FLI is to be added to the RSVP-TE path message, adding the FLI to a type length value (TLV) field of the RSVP-TE path message and marking the FLI flag bit as 'yes'; and
in instances where the FLI is not to be added to the RSVP-TE path message, marking the FLI flag bit as 'no'.

5. The method according to claim 2, further comprising:
determining, according to the first FL capability flag bit and the second FL capability flag bit, whether a path between the ingress node and the egress node supports forwarding a packet carrying an FL;
wherein
if either of the ingress node or the egress node cannot process the FL or cannot insert the FL, the path between the ingress node and the egress node is indicated as not supporting forwarding a packet carrying an FL; or
if both the ingress node and the egress node can process the FL and can insert the FL, the path between the ingress node and the egress node is indicated as supporting forwarding a packet carrying an FL.

6. The method according to claim 4, wherein
the RSVP-TE resv message further comprises a third FL capability flag bit indicating whether the load distribution node has a label-based path calculation capability.

7. The method according to claim 6, further comprising:
determining, according to the first FL capability flag bit, the second FL capability flag bit, and the third FL capability flag bit, whether a path between the ingress node and the egress node supports forwarding a packet carrying an FL;
wherein
if either of the ingress node or the egress node cannot process the FL or cannot insert the FL, or the load distribution node does not have the label-based path calculation capability, the path between the ingress node and the egress node is indicated as not supporting forwarding a packet carrying an FL; or
if both the ingress node and the egress node can process the FL and can insert the FL, and the load distribution node has the label-based path calculation capability, the path between the ingress node and the egress node is indicated as supporting forwarding a packet carrying an FL.

8. A method performed by a load distribution node for obtaining a flow label (FL) processing capability, the method comprising:
receiving a resource reservation protocol-traffic engineering (RSVP-TE) path message from an ingress node, wherein the RSVP-TE path message comprises a first FL capability flag bit indicating whether the ingress node can process an FL carried in a packet received from an egress node;
obtaining, from the first FL capability flag bit, an indication whether the ingress node can process the FL carried in the packet;
forwarding the RSVP-TE path message to the egress node;
receiving an RSVP-TE resv message from the egress node, wherein the RSVP-TE resv message comprises a second FL capability flag bit indicating whether the egress node can process an FL carried in a packet received from the ingress node;
obtaining, from the second FL capability flag bit, an indication whether the egress node can process the FL carried in the packet received from the ingress node;
determining, from the first and second FL capability bits, whether local path calculation is set as label-based path calculation; and
forwarding the RSVP-TE resv message to the ingress node.

9. The method according to claim 8, wherein the first FL capability flag bit further designates whether the ingress node is configured to can insert an FL in a packet to be sent to the egress node, the second FL capability flag bit further designates whether the egress node can insert an FL in a packet to be sent to the ingress node, wherein the determining whether the local path calculation is set as the label-based path calculation comprises at least one of:
setting the local path calculation along a direction from the ingress node to the egress node as the label-based path calculation in instances where the ingress node is configured to insert the FL in the packet to be sent to the egress node and the egress node is operable to process the FL carried in the packet received from the ingress node; and
setting the local path calculation along a direction from the egress node to the ingress node as the label-based path calculation in instances where the egress node is configured to insert the FL in the packet to be sent to the ingress node and the ingress node is operable to process the FL carried in the packet received from the egress node.

10. The method according to claim 8, further comprising:
adding a load FL capability flag bit in the RSVP-TE path message, wherein the load FL capability flag bit designates whether the load distribution node has a label-based path calculation capability;
determining whether the load distribution node has label-based path calculation capability, wherein;
responsive to determining that the load distribution node has label-based path calculation capability, triggering the step of obtaining from the first FL capability flag bit, and marking the load FL capability flag bit to indicate the load distribution node has the label-based path calculation capability; and
responsive to determining that load distribution node does not have label-based path calculation capability, marking the load FL capability flag bit to indicate the load distribution node does not have the label-based path calculation capability, and triggering the step of forwarding the RSVP-TE path message to the egress node.

11. The method according to claim 8, further comprising:
adding a third FL capability flag bit in the RSVP-TE resv message; and
marking whether the load distribution node has a label-based path calculation capability in the third FL capability flag bit.

12. A method performed by an egress node for negotiating a flow label (FL) processing capability, the method comprising:
- receiving a resource reservation protocol-traffic engineering (RSVP-TE) path message from an ingress node, wherein the RSVP-TE path message comprises a first FL capability flag bit designating whether the ingress node is configured to process an FL carried in a packet received from an egress node;
- obtaining, from the first FL capability flag bit, an indication whether the ingress node is configured to process the FL carried in the packet received from an egress node;
- constructing an RSVP-TE resv message according to the RSVP-TE path message, wherein the RSVP-TE resv message comprises a second FL capability flag bit;
- marking, in the second FL capability flag bit, whether the egress node can process an FL carried in a packet received from the ingress node; and
- sending the RSVP-TE resv message to the ingress node.

13. The method according to claim 12, wherein the RSVP-TE path message is sent through a load distribution node,
- the first FL capability flag bit designating whether the ingress node is operable to insert an FL in a packet to be sent to the egress node; and
- the second FL capability flag bit further designating whether the egress node can insert an FL in a packet to be sent to the ingress node.

14. The method according to claim 13,
wherein the constructing the RSVP-TE resv message comprises one of:
- adding a type length value (TLV) field in an object field of the RSVP-TE resv message and storing the second FL capability flag bit in the TLV field; or
- adding a resv field in an object field of the RSVP-TE resv message and storing the second FL capability flag bit in the resv field.

15. The method according to claim 13, wherein the RSVP-TE resv message further comprises a flow label indicator (FLI) flag bit
the method further comprising:
- determining whether an FLI needs to be added to the RSVP-TE resv message and, in instances where
- in response to determining that the FLI needs to be added to the RSVP-TE resv message, adding the FLI to a type length value (TLV) field of the RSVP-TE resv message and marking the FLI flag bit is marked as "yes"; and
- in response to determining that the FLI does not need to be added to the RSVP-TE resv message, marking the FLI flag bit as "no".

16. The method according to claim 13, wherein
the RSVP-TE path message further comprises a load FL capability flag bit designating whether the load distribution node has a label-based path calculation capability;
wherein the RSVP-TE resv message comprises a third FL capability flag bit; and
wherein the constructing the RSVP-TE resv message according to the RSVP-TE path message comprises setting the third FL capability flag bit according to the load FL capability flag bit.

17. A node, comprising:
a path message constructing unit, configured to construct a resource reservation protocol-traffic engineering (RSVP-TE) path message, wherein the RSVP-TE path message comprises a first flow label (FL) capability flag bit;
an ingress capability marking unit, configured to mark, in the first FL capability flag bit, whether the ingress node has the capability of processing an FL carried in a packet received from an egress node;
a path message sending unit, configured to send the RSVP-TE path message to the egress node;
a resv message receiving unit, configured to receive an RSVP-TE resv message from the egress node, wherein the RSVP-TE resv message comprises a second FL capability flag bit designating whether the egress node has the capability of processing an FL carried in a packet received from the ingress node; and
an egress capability obtaining unit, configured to obtain, from the second FL capability flag bit, an indication whether the egress node has the capability of processing the FL carried in the packet received from the ingress node.

18. The node according to claim 17, wherein the path message sending unit is configured to send the RSVP-TE path message to the egress node through a load distribution node, wherein:
- the second FL capability flag bit further designates whether the egress node is operable to insert an FL in a packet to be sent to the ingress node;
- wherein the ingress capability marking unit is further configured to mark, in the first FL capability flag bit, whether the ingress node is operable to insert an FL in a packet to be sent to the egress node; and
- the egress capability obtaining unit is further configured to obtain, from the RSVP-TE resv message, whether the egress node can insert the FL in the packet to be sent to the egress node.

19. The node according to claim 18, further comprising: a path flow label indicator (FLI) determination unit, a path FLI adding unit, and a path FLI marking unit; wherein
- the path FLI judgment unit is configured to determine whether an FLI is to be added to the RSVP-TE path message, and in response to determining that the FLI is to be added to the RSVP-TE path message, trigger the path FLI adding unit to add the FLI to the RSVP-TE path message, and trigger the path FLI marking unit to mark an FLI flag bit as "yes", and in response to determining that the FLI is not to be added to the RSVP-TE path message, trigger the path FLI marking unit to mark the FLI adding flag bit as "no";
- the path FLI adding unit is configured to add the FLI in a type length value (TLV) field of the RSVP-TE path message; and
- the path FLI marking unit is configured to mark whether the FLI is added to the RSVP-TE path message.

20. The node according to claim 18, further comprising:
- an FL forwarding determination unit, configured to determine, according to the first FL capability flag bit and the second FL capability flag bit, whether a path between the ingress node and the egress node supports forwarding a packet carrying an FL;
- wherein if either of the ingress node or the egress node is not operable to process the FL or to insert the FL, the path between the ingress node and the egress node is designated as not supporting forwarding a packet carrying an FL; or if both the ingress node and the egress node can process the FL and can insert the FL, the path between the ingress node and the egress node is designated as supporting forwarding a packet carrying an FL.

21. A node configured as a load distribution node, comprising:
a first receiving unit, configured to receive a resource reservation protocol-traffic engineering (RSVP-TE) path message from an ingress node, wherein the RSVP-TE path message comprises a first flow label (FL) capability flag bit designating whether the ingress node can process an FL carried in a packet received from an egress node;

a first obtaining unit, configured to obtain, from the first FL capability flag bit, an indication whether the ingress node can process the FL carried in the packet received from the egress node;

a first forwarding unit, configured to forward the RSVP-TE path message to the egress node;

a second receiving unit, configured to receive an RSVP-TE resv message from the egress node, wherein the RSVP-TE resv message comprises a second FL capability flag bit designating whether the egress node can process an FL carried in a packet received from the ingress node;

a second obtaining unit, configured to obtain, from the second FL capability flag bit, an indication whether the egress node can process the FL carried in the packet received from the ingress node;

a setting unit, configured to determine, according to the obtained results from the first FL capability flag and the second FL capability flag, an indication whether local path calculation is set as label-based path calculation; and a second forwarding unit, configured to forward the RSVP-TE resv message to the ingress node.

22. The node according to claim 21, wherein the setting unit comprises:

a first setting module, configured to set a local path calculation along a direction from the ingress node to the egress node as a label-based path calculation in instances where the ingress node is configured to insert the FL in the packet to be sent to the egress node and the egress node is operable to process the FL carried in the packet received from the ingress node; and a second setting module, configured to set the local path calculation along a direction from the egress node to the ingress node as a label-based path calculation in instances where the egress node is operable to insert the FL in the packet to be sent to the ingress node and the ingress node is operable to process the FL carried in the packet received from the egress node.

23. The node according to claim 21, further comprising an FL capability judgment unit and an FL capability marking unit, wherein:

the FL capability judgment unit is configured to determine whether the load distribution node has a label-based path calculation capability, and when the load distribution node has the label-based path calculation capability, trigger the first obtaining unit and trigger the FL capability marking unit to mark a load FL capability flag bit to indicate the load distribution node has the label-based path calculation capability, and when the load distribution node dose not have the label-based path calculation capability, trigger the FL capability marking unit to mark the load FL capability flag bit to indicate the load distribution node does not have the label-based path calculation capability and trigger the first forwarding unit; and the FL capability marking unit is configured to mark whether the load distribution node has the label-based path calculation capability.

24. A node configured as an egress node, comprising:

a path message receiving unit, configured to receive a resource reservation protocol-traffic engineering (RSVP-TE) path message from an ingress node, wherein the RSVP-TE path message comprises a first flow label (FL) capability flag bit designating whether the ingress node can process an FL carried in a packet received from an egress node;

an ingress capability obtaining unit, configured to obtain, from the first FL capability flag bit, an indication whether the ingress node is configured to process the FL carried in the packet received from an egress node;

a resv message constructing unit, configured to construct an RSVP-TE resv message according to the RSVP-TE path message, wherein the RSVP-TE resv message comprises a second FL capability flag bit;

an egress capability marking unit, configured to mark, in the second FL capability flag bit, whether the egress node is configured to process an FL carried in a packet received from the ingress node; and a resv message sending unit, configured to send the RSVP-TE resv message to the ingress node.

25. The node according to claim 24, wherein the path message receiving unit is configured to receive the RSVP-TE path message through a load distribution node, and the resv message sending unit is configured to send the RSVP-TE resv message through the load distribution node; and the first FL capability flag bit is configured to indicate whether the ingress node can insert an FL in a packet to be sent to the egress node;

wherein the ingress capability obtaining unit is further configured to obtain, from the first FL capability flag bit, an indication whether the ingress node can insert the FL in the packet to be sent to the egress node;

the egress capability marking unit is further configured to mark, in the second FL capability flag bit, an indication whether the egress node can insert an FL in a packet to be sent to the ingress node.

26. The node according to claim 25, further comprising a reservation flow label indicator (FLI) judgment unit, a reservation FLI adding unit, and a reservation FLI marking unit, wherein:

the reservation FLI judgment unit is configured to determine whether an FLI is to be added to the RSVP-TE resv message, and in response to determining that the FLI is to be added to the RSVP-TE resv message, trigger the reservation FLI adding unit and trigger the reservation FLI marking unit to mark an FLI flag bit as "yes", and in response to determining that the FLI is not to be added to the RSVP-TE resv message, trigger the reservation FLI marking unit to mark the FLI flag bit as "no";

the reservation FLI adding unit is configured to add the FLI to a type length value (TLV) field of the RSVP-TE resv message; and the reservation FLI marking unit is configured to mark whether the FLI is added to the RSVP-TE resv message.

27. A system for negotiating a flow label (FL) processing capability, comprising: an ingress node, a load distribution node, and an egress node, wherein:

the ingress node is configured to construct a resource reservation protocol-traffic engineering (RSVP-TE) path message comprising a first FL capability flag bit designating whether the ingress node is configured to process an FL carried in a packet received from an egress node; send the RSVP-TE path message to the egress node through the load distribution node;

receive an RSVP-TE resv message which is from the egress node wherein the RSVP-TE resv message comprises a second FL capability flag bit indicating whether the egress node is configured to process an FL carried in a packet received from the ingress node and obtain, from the second FL capability flag bit, whether the egress node is configured to process the FL carried in the packet received from the ingress node;

the load distribution node is configured to receive the RSVP-TE path message from the ingress node;
- obtain, from the first FL capability flag bit, an indication whether the ingress node can process the FL carried in the packet received from an egress node;
- forward the RSVP-TE path message to the egress node;
- receive the RSVP-TE resv message from the egress node;
- obtain, from the second FL capability flag bit, an indication whether the egress node is configured to process the FL carried in the packet received from the ingress node and determine, according to the obtained results from the first FL capability flag and the second FL capability flag, an indication whether local path calculation is set as label-based path calculation; and forward the RSVP-TE resv message to the ingress node; and the egress node is configured to receive the RSVP-TE path message from the ingress node through the load distribution node;
- obtain, from the first FL capability flag bit, node an indication whether the ingress node is operable to process the FL carried in the packet received from an egress node;
- construct the RSVP-TE resv message according to the RSVP-TE path message, and mark in the second FL capability flag bit, whether the egress node is configured to process the FL carried in the packet received from the ingress node; and
- send the RSVP-TE resv message to the ingress node through the load distribution node.

* * * * *